US012632060B2

(12) United States Patent (10) Patent No.: US 12,632,060 B2
Iwahori (45) Date of Patent: May 19, 2026

(54) TERMINAL APPARATUS, REMOTE CONTROL SYSTEM, AND REMOTE CONTROL METHOD

(71) Applicant: TOYOTA JIDOSHA KABUSHIKI KAISHA, Toyota (JP)

(72) Inventor: Kento Iwahori, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 91 days.

(21) Appl. No.: 18/654,397

(22) Filed: May 3, 2024

(65) Prior Publication Data

US 2024/0427342 A1 Dec. 26, 2024

(30) Foreign Application Priority Data

Jun. 21, 2023 (JP) ................................. 2023-101461

(51) Int. Cl.
G05D 1/225 (2024.01)
G05D 1/249 (2024.01)
(Continued)

(52) U.S. Cl.
CPC ............. G05D 1/225 (2024.01); G05D 1/249 (2024.01); G06V 20/50 (2022.01);
(Continued)

(58) Field of Classification Search
CPC .... G05D 1/225; G05D 1/249; G05D 2107/70; G05D 1/6987; G05D 2105/45;
(Continued)

(56) References Cited

U.S. PATENT DOCUMENTS

2002/0198618 A1* 12/2002 Madden ................. B62D 65/02
700/115
2017/0320529 A1 11/2017 Nordbruch
(Continued)

FOREIGN PATENT DOCUMENTS

JP 2017-538619 A 12/2017
JP 2021062790 A * 4/2021

OTHER PUBLICATIONS

JP2021062790A English Translation of the Description (Year: 2021).*

*Primary Examiner* — Kito R Robinson
*Assistant Examiner* — Alexander V Gentile
(74) *Attorney, Agent, or Firm* — Sughrue Mion, PLLC

(57) ABSTRACT

In a terminal apparatus used to perform remote control on a driving operation of a vehicle, the terminal apparatus includes a first processor configured to complement a complement target function. The vehicle is configured to move by remote control in a factory in which a plurality of manufacturing steps is performed to manufacture the vehicle. The functional unit that implements a plurality of functions necessary for the remote control is mounted on the vehicle in any one of the plurality of manufacturing steps. The complement target function is identified by using at least one of step information indicating the manufacturing step performed on the vehicle and communication availability information indicating whether communication with the functional unit is available and is not implemented by the functional unit mounted on the vehicle of the plurality of functions necessary for the remote control.

9 Claims, 17 Drawing Sheets

(51) Int. Cl.
   *G06V 20/50*          (2022.01)
   *G05B 23/02*          (2006.01)
   *G05D 107/70*         (2024.01)

(52) U.S. Cl.
   CPC ..... *G05B 23/0213* (2013.01); *G05D 2107/70*
                  (2024.01); *G06V 2201/06* (2022.01)

(58) Field of Classification Search
   CPC .......... G05D 2109/10; G05D 2111/10; G06V
                  20/50; G06V 2201/06; G05B 23/0213
   See application file for complete search history.

(56)                  References Cited

U.S. PATENT DOCUMENTS

2020/0140028 A1*   5/2020   Wells .................. G05D 1/0225
2021/0397178 A1*  12/2021   Thomas .............. G05D 1/0238

* cited by examiner

FIG. 2

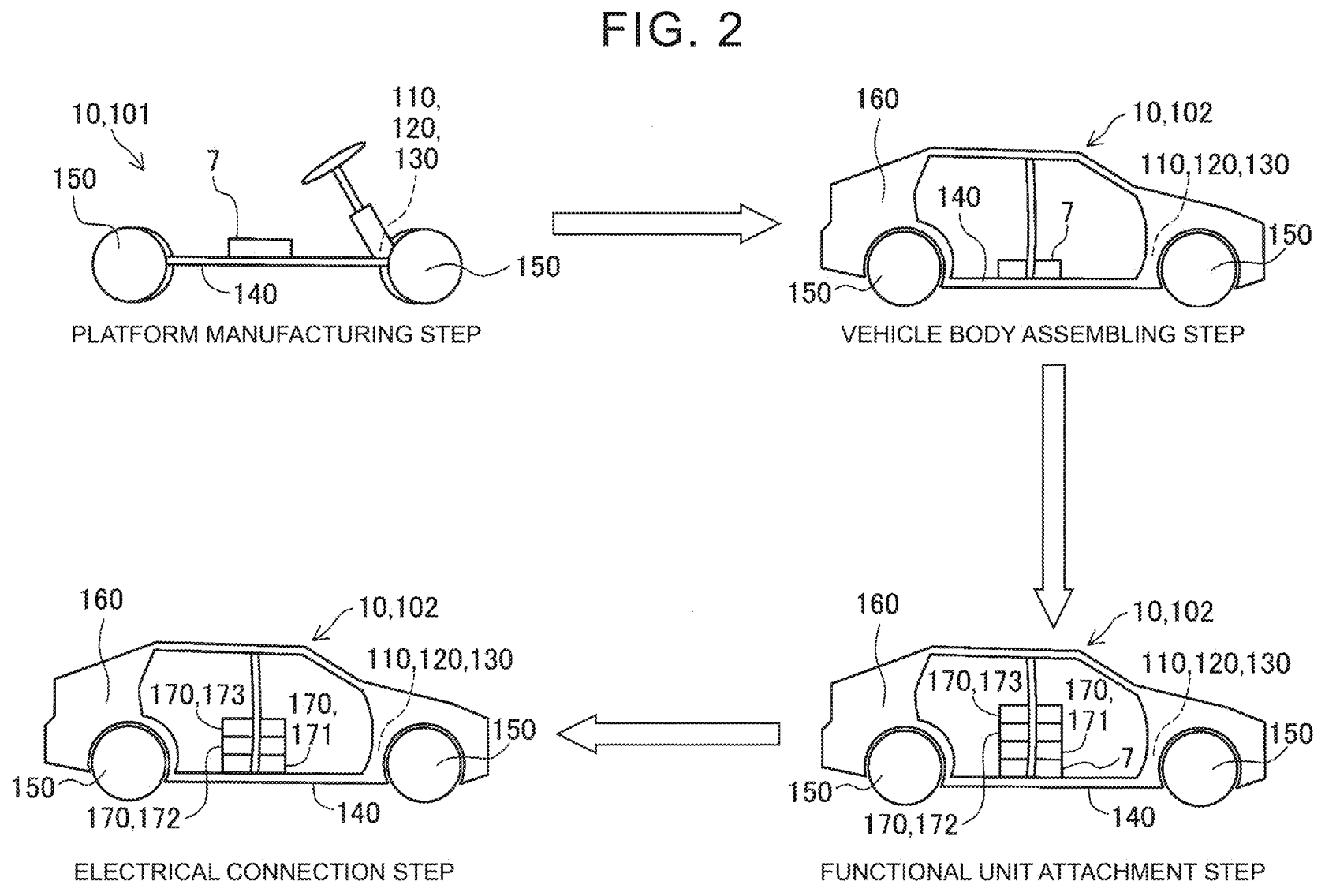

PLATFORM MANUFACTURING STEP

VEHICLE BODY ASSEMBLING STEP

FUNCTIONAL UNIT ATTACHMENT STEP

ELECTRICAL CONNECTION STEP

FIG. 3

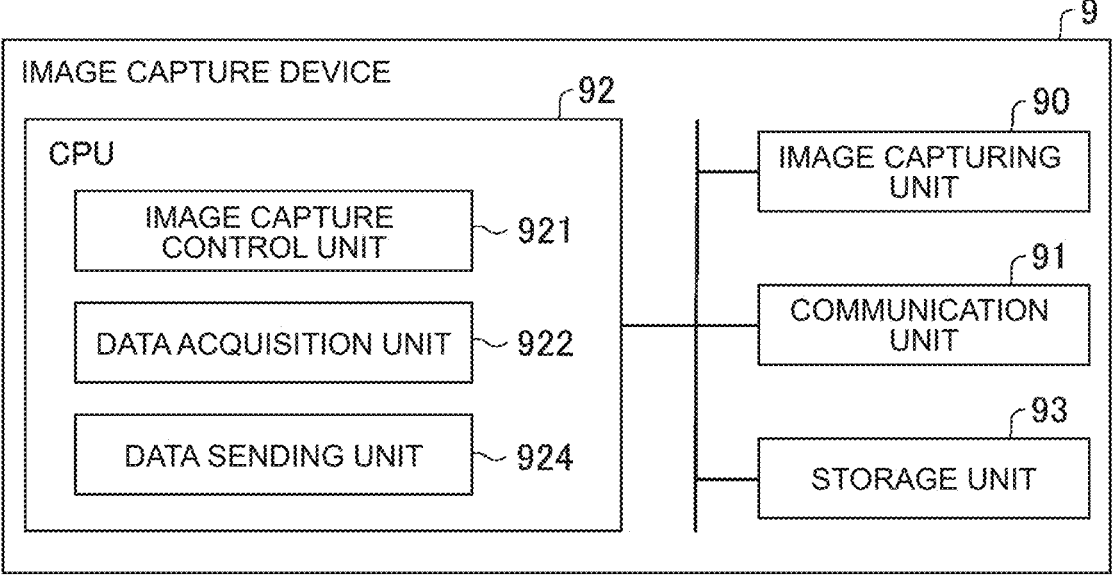

IMAGE CAPTURE DEVICE　　9

CPU　92

- IMAGE CAPTURE CONTROL UNIT　921
- DATA ACQUISITION UNIT　922
- DATA SENDING UNIT　924

- IMAGE CAPTURING UNIT　90
- COMMUNICATION UNIT　91
- STORAGE UNIT　93

FIG. 4

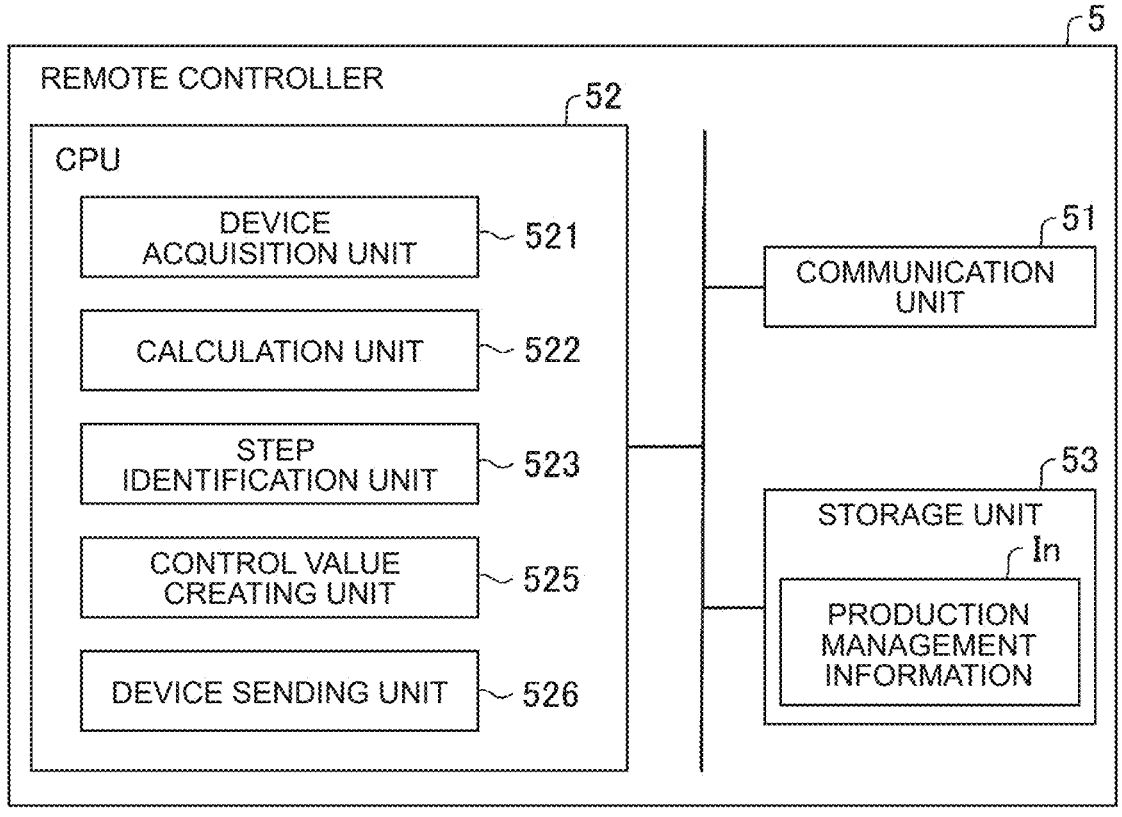

REMOTE CONTROLLER　5

CPU　52

- DEVICE ACQUISITION UNIT　521
- CALCULATION UNIT　522
- STEP IDENTIFICATION UNIT　523
- CONTROL VALUE CREATING UNIT　525
- DEVICE SENDING UNIT　526

- COMMUNICATION UNIT　51
- STORAGE UNIT　53
  - PRODUCTION MANAGEMENT INFORMATION　In

ACQUISITION STEP (STEP S11)

IDENTIFICATION STEP (STEP S21)

ACQUISITION STEP (STEP S12)

IDENTIFICATION STEP (STEP S22)

REMOTE CONTROLLER 5a

ACQUIRE STEP DATABASE S221

IDENTIFY COMPLEMENT TARGET FUNCTIONS BY USING STEP DATABASE AND STEP INFORMATION S222

END

ACQUISITION STEP (STEP S13)

IDENTIFICATION STEP (STEP S23)

START

ACQUISITION STEP —— S14

IDENTIFICATION STEP —— S22

SELECTION STEP —— S34

MOUNTING STEP —— S44

END

ACQUISITION STEP (STEP S14)

INPUT DEVICE ⌐8

REMOTE CONTROLLER ⌐5c

RECEIVE INPUT OF
STEP INFORMATION FROM WORKER ⌐S141

SEND STEP INFORMATION
(S142)

ACQUIRE STEP INFORMATION ⌐S143

END

END

TERMINAL APPARATUS, REMOTE CONTROL SYSTEM, AND REMOTE CONTROL METHOD

CROSS-REFERENCE TO RELATED APPLICATION

This application claims priority to Japanese Patent Application No. 2023-101461 filed on Jun. 21, 2023, incorporated herein by reference in its entirety.

BACKGROUND

1. Technical Field

The disclosure relates to a terminal apparatus, a remote control system, and a remote control method.

2. Description of Related Art

There is known a vehicle that automatically moves by remote control (Japanese Unexamined Patent Application Publication (Translation of PCT Application) No. 2017-538619 (JP 2017-538619 A)).

SUMMARY

A functional unit, such as a vehicle controller and a communication unit, that implements functions necessary for remote control is possibly not mounted on a vehicle in manufacturing. In this case, the functions necessary for remote control can be possibly not implemented.

The disclosure may be implemented as the following aspects.

(1) A first aspect of the disclosure provides a terminal apparatus. A terminal apparatus is used to perform remote control on a driving operation of a vehicle. The vehicle is configured to move by remote control in a factory in which a plurality of manufacturing steps is performed to manufacture the vehicle. The functional unit that implements a plurality of functions necessary for the remote control is mounted on the vehicle in any one of the plurality of manufacturing steps. The terminal apparatus includes a first processor configured to complement a complement target function. The complement target function is identified by using at least one of step information indicating the manufacturing step performed on the vehicle and communication availability information indicating whether communication with the functional unit is available. The complement target function is not implemented by the functional unit mounted on the vehicle of the plurality of functions necessary for the remote control. According to this configuration, a terminal apparatus that complements a complement target function is mounted on a vehicle in manufacturing, on which at least one or some of a plurality of functional units that implement functions necessary for remote control are not yet mounted, with the result that the vehicle is allowed to move by remote control. Thus, even a vehicle in manufacturing, on which at least one or some of a plurality of functional units are not yet mounted, is allowed to move by remote control.

(2) In the first aspect, the first processor may be configured to acquire the step information, and identify the complement target function according to the manufacturing step performed on the vehicle by identifying the complement target function associated with the manufacturing step other than the manufacturing step identified by the acquired step information using the acquired step information and a step database indicating the complement target function necessary for each of the plurality of manufacturing steps. According to this configuration, the terminal apparatus is capable of identifying a complement target function by using step information and a step database.

(3) In the first aspect, the first processor may be configured to acquire the communication availability information and identify the complement target function by using the acquired communication availability information. According to this configuration, the terminal apparatus is capable of identifying a complement target function by using communication availability information.

(4) A second aspect of the disclosure provides a remote control system. The remote control system performs remote control on a driving operation of a vehicle. The remote control system includes the vehicle, an external apparatus installed in a place different from a place where the vehicle is, and the terminal apparatus according to the first aspect. The functional unit that implements a plurality of functions necessary for the remote control is mounted on the vehicle in any one of the plurality of manufacturing steps. The external apparatus includes a second processor. The second processor is configured to acquire step information indicating the manufacturing step performed on the vehicle, generate function information indicating the complement target function according to the manufacturing step performed on the vehicle by identifying the complement target function associated with the manufacturing step other than the manufacturing step identified by the acquired step information using the acquired step information and a step database indicating the complement target function necessary for each of the plurality of manufacturing steps, and send the function information to the vehicle. According to this configuration, the external apparatus is capable of identifying a complement target function by using step information and a step database. The external apparatus is capable of generating function information indicating the identified complement target function and sending the complement target function to the terminal apparatus. According to this configuration, the first processor of the terminal apparatus is capable of complementing a complement target function based on function information.

(5) A third aspect of the disclosure provides a remote control method. The remote control method performs remote control on a driving operation of a vehicle. The vehicle is configured to move by remote control in a factory in which a plurality of manufacturing steps is performed to manufacture the vehicle. The functional unit that implements a plurality of functions necessary for the remote control is mounted on the vehicle in any one of the plurality of manufacturing steps. The remote control method includes acquiring at least one of step information indicating the manufacturing step performed on the vehicle and communication availability information indicating whether communication with the functional unit is available, identifying a complement target function, wherein, of the plurality of functions necessary for the remote control, the complement target function is identified by using the acquired information and not implemented by the functional unit mounted on the vehicle of the plurality of functions necessary for the remote control, and mounting one or more terminal apparatuses having the identified complement target function on the vehicle from among the plurality of terminal apparatuses each having one or more of the complement target functions. According to this configuration, it is possible to mount one or more terminal apparatuses having the identified complement target function on the vehicle from among the plurality of terminal apparatuses each having one or more complement target functions. Thus, even a vehicle in manufacturing, on which at least one or some of a plurality of functional units that implement functions necessary for the remote control are not yet mounted, is allowed to move by remote control.

(6) In the third aspect, the remote control method may further include determining whether to mount the terminal apparatus on the vehicle. According to this configuration, it is possible to determine whether to mount the terminal apparatus.

(7) In the third aspect, the remote control method may further include removing the terminal apparatus mounted on the vehicle from the vehicle. According to this configuration, it is possible to remove an unnecessary terminal apparatus from the vehicle.

(8) In the third aspect, the vehicle may be any one of a first-type vehicle in a form of platform, at least including a wheel, a chassis, a drive unit configured to accelerate the vehicle, a steering device configured to change a traveling direction of the vehicle, and a braking device configured to decelerate the vehicle, and a second-type vehicle in a form in which at least a vehicle body is assembled to the first-type vehicle. According to this configuration, it is possible to cause the first-type vehicle and the second-type vehicle to move by remote control.

The disclosure may be implemented in various modes other than the above-described terminal apparatus, remote control system, or remote control method. The disclosure may be implemented by, for example, a manufacturing method for a terminal apparatus and a remote control system, a control method for a terminal apparatus and a remote control system, a non-transitory recording medium on which a computer program that implements the control method is recorded, and the like.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a diagram that shows an example of a manufacturing process of a vehicle;

FIG. 3 is a block diagram that shows the configuration of an image capture device according to the first embodiment;

FIG. 4 is a block diagram that shows the configuration of a remote controller according to the first embodiment;

DETAILED DESCRIPTION OF EMBODIMENTS

A. First Embodiment

Figure 1:
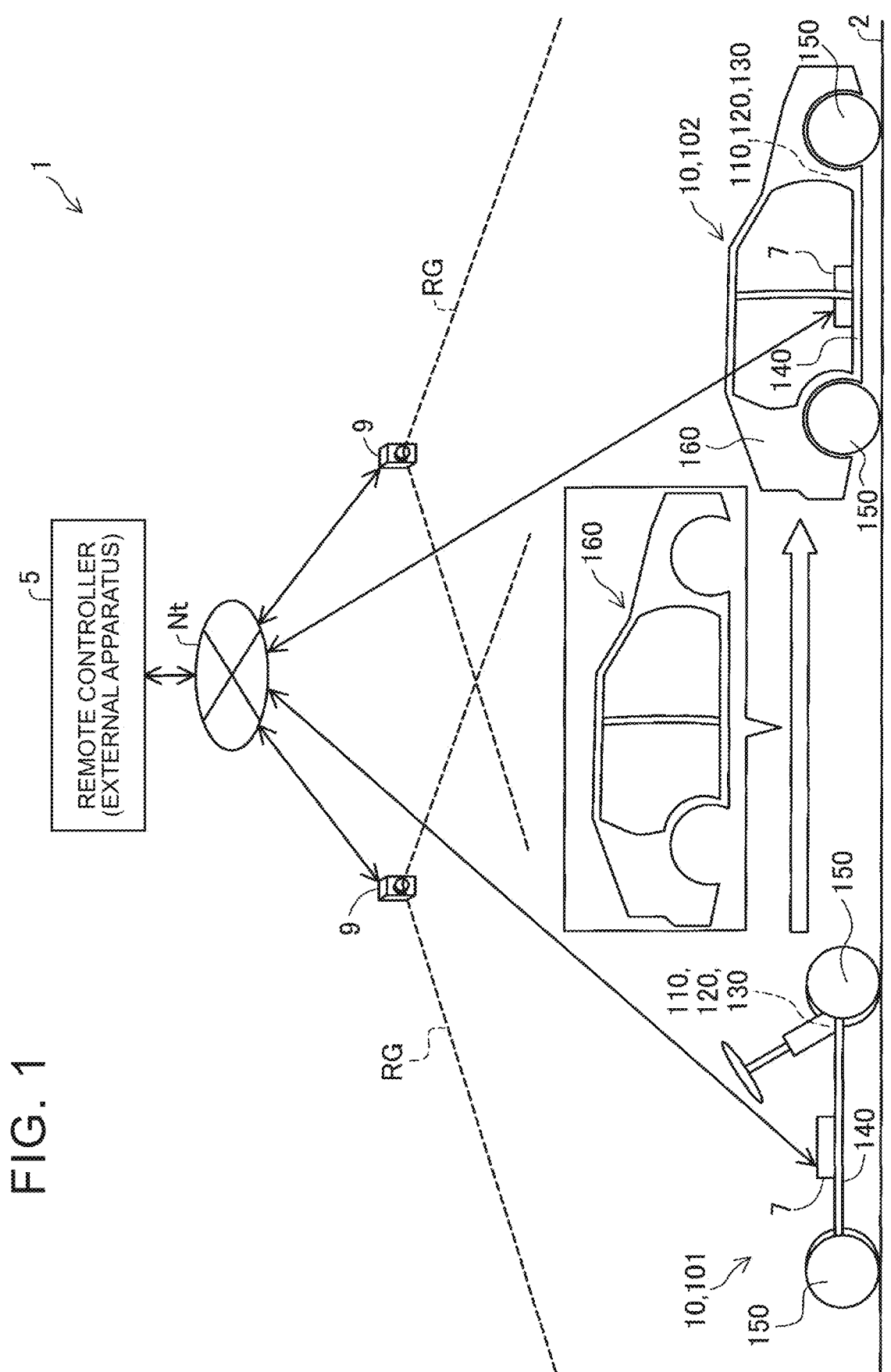
FIG. 1 is a diagram that shows the configuration of a remote control system according to a first embodiment.

FIG. 1 is a diagram that shows the configuration of a remote control system 1 according to a first embodiment. The remote control system 1 performs remote control on a driving operation of a vehicle 10. The remote control system 1 includes one or more vehicles 10, a remote controller 5 serving as an external apparatus installed in a place different from a place where the vehicle 10 is, and a terminal apparatus 7 used to perform remote control on the driving operation of the vehicle 10. In the present embodiment, the remote control system 1 further includes a plurality of image capture devices 9 as sensors that detect the vehicle 10 from outside the vehicle 10 to calculate the position and orientation of the vehicle 10.

The vehicle 10 is any one of a battery electric vehicle, a hybrid electric vehicle, a fuel cell electric vehicle, a gasoline vehicle, and a diesel vehicle. The vehicle 10 may be a private automobile, such as a passenger vehicle, or may be a commercial automobile, such as a truck, a bus, and a construction vehicle.

The vehicle 10 is configured to move in a remote automated driving mode in a factory in which a plurality of manufacturing steps is performed to manufacture the vehicle 10. In the remote automated driving mode, the remote controller 5, such as a server, creates a control value (driving control value) that defines the driving operation of the vehicle 10 and sends the driving control value to the vehicle 10. Thus, the vehicle 10 receives the driving control value and performs automated driving according to the received driving control value. The factory is not limited to a case of being present in a building, a case of being present at a site or address, or the like and may be present over a plurality of buildings, a plurality of sites, a plurality of addresses, or the like. At this time, the vehicle 10 may move not only on a private road but also on a public road. The factory may include a storage location, such as a yard. The storage location is a place where the vehicle 10 as a finished product manufactured by performing a plurality of manufacturing steps is stored before shipment.

FIG. 2 is a diagram that shows an example of a manufacturing process of the vehicle 10. In FIG. 2, some of the plurality of manufacturing steps that are performed in the manufacturing process of the vehicle 10 are representatively shown. In the example shown in FIG. 2, the vehicle 10 serving as a finished product is manufactured by assembling a vehicle body 160, such as a body shell, interior parts, such as seats, exterior parts, such as door panels, and the like to a first-type vehicle 101 in a form of platform. At this time, the functional units 170 that implement a plurality of functions necessary for the remote control are mounted on the vehicle 10 in any one of the plurality of manufacturing steps. In the embodiment of the disclosure, "mounting" means a state where the function of a device attached to the vehicle 10 is implemented. In other words, "mounting" is a state where a device is attached to the vehicle 10 and electrically connected to the vehicle 10. Hereinafter, the vehicle 10 in a form in which at least the vehicle body 160 is assembled to the first-type vehicle 101 is referred to as a second-type vehicle 102.

A platform manufacturing step is a manufacturing step of manufacturing the first-type vehicle 101. The first-type vehicle 101 is a vehicle 10 capable of achieving at least three functions, that is, "moving", "turning", and "stopping", through remote control by the remote controller 5 when the terminal apparatus 7 is mounted on the first-type vehicle 101 as needed. Specifically, the first-type vehicle 101, for example, includes at least a drive unit 110, a steering device 120, a braking device 130, a chassis 140, and wheels 150. The drive unit 110 accelerates the vehicle 10. The drive unit 110 includes at least a driving force source and a power supply device that supplies power to the driving force source. When the vehicle 10 is a battery electric vehicle, the driving force source is a drive motor, and the power supply device is a main battery, such as a lithium ion battery. The steering device 120 changes the traveling direction of the vehicle 10. The braking device 130 decelerates the vehicle 10. The chassis 140 is a chassis part that supports various devices 110, 120, 130, 170 to be mounted on the vehicle 10, and the vehicle body 160 and the like to be assembled in subsequent manufacturing steps after the platform manufacturing step. Furthermore, in the present embodiment, in the platform manufacturing step, the terminal apparatus 7 is detachably mounted on the first-type vehicle 101. Work for mounting the terminal apparatus 7 on the first-type vehicle 101 may be performed by a worker or may be performed by a robot.

A vehicle body assembling step is a manufacturing step of manufacturing the second-type vehicle 102 that is a vehicle 10 after the vehicle body 160 is assembled to the first-type vehicle 101 and that includes a finished product. The vehicle body assembling step is performed after the platform manufacturing step.

A functional unit attachment step is a step of attaching the functional units 170 to the vehicle 10. In the example shown in FIG. 2, the functional unit attachment step is performed after the vehicle body assembling step. Each of the functional units 170 is, for example, any one of a vehicle controller 171, a vehicle communication unit 172, and a sub-battery 173. The vehicle controller 171 controls the operation of the vehicle 10. The vehicle controller 171 includes a plurality of ECUs. Specifically, the vehicle controller 171 includes an integrated ECU and a plurality of individual ECUs. The integrated ECU relays communication with each individual ECU. The integrated ECU is connected to the vehicle communication unit 172 and each individual ECU such that communication is possible. The integrated ECU is a so-called gateway ECU. The individual ECUs respectively control the operations of various devices mounted on the vehicle 10. The individual ECUs are, for example, a DCM-ECU that controls the vehicle communication unit 172, a brake ECU that controls a brake, an engine ECU that controls an engine, an MG-ECU that controls the drive motor, and an HV-ECU that cooperatively manages and controls the engine ECU and the MG-ECU. The vehicle communication unit 172 communicates with external apparatuses by using wireless communication or the like. The external apparatuses are other devices other than the host vehicle 10 and other vehicles 10. The devices other than the host vehicle 10 are the remote controller 5 and the like. The vehicle communication unit 172 is, for example, a wireless communication device, such as a data communication module (DCM). The vehicle communication unit 172, for example, communicates with the remote controller connected to a network Nt via an access point in a factory. The sub-battery 173 supplies electric power to the vehicle controller 171 and the vehicle communication unit 172 to drive the vehicle controller 171 and the vehicle communication unit 172. The configuration of the functional units 170 is not limited to the above. For example, at least one or some of the functions of the vehicle controller 171 may be implemented as one function of the vehicle communication unit 172.

An electrical connection step is a step of establishing a state where the functions of the functional units 170 are implemented, by electrically connecting the functional units 170 attached to the vehicle 10. The electrical connection step is performed after the functional unit attachment step. When the functional units 170 are electrically connected after being attached to the vehicle 10, the functions necessary for the remote control are implemented. The manufacturing method for the vehicle 10 is not limited to the above. The functional unit attachment step may be performed at another timing different from that of FIG. 2 in the manufacturing process of the vehicle 10. The electrical connection step just needs to be performed after the functional unit attachment step and may be performed at another timing different from that of FIG. 2.

In the embodiment of the disclosure, the vehicle 10 is at least any one of the vehicle 10 serving as a finished product and the vehicle 10 serving as a half-finished product and a product in process in each manufacturing step of manufacturing a finished product. Hereinafter, when the plurality of vehicles 101, 102 different in form does not need to be distinguished from each other, the vehicles 101, 102 are simply referred to as "vehicle 10".

FIG. 3 is a block diagram that shows the configuration of the image capture device 9 according to the first embodiment. As shown in FIG. 1, the image capture device 9 is a camera that acquires captured data by capturing the image of an image capturing range RG, containing the vehicle 10, from outside the vehicle 10. The captured data is, for example, a color image containing the vehicle 10. To capture the image of the entire course 2 with the one or more image capture devices 9, the installation location of each image capture device 9 and the number of image capture devices 9 are determined in consideration of the image capturing range RG (angle of view) of each image capture device 9.

As shown in FIG. 3, the image capture device 9 includes an image capturing unit 90, a communication unit 91, a storage unit 93, and a CPU 92. The image capturing unit 90, the communication unit 91, the storage unit 93, and the CPU 92 are connected to one another via, for example, an internal bus and an interface circuit. The image capturing unit 90 captures the image of the image capturing range RG containing the vehicle 10 from outside the vehicle 10. The communication unit 91 of the image capture device 9 connects the image capture device 9 to other devices other than the image capture device 9 such that communication is possible. The communication unit 91 of the image capture device 9 is, for example, a wireless communication device. The storage unit 93 of the image capture device 9 stores various pieces of information including various programs for controlling the operation of the image capture device 9. The storage unit 93 of the image capture device 9 includes, for example, a RAM, a ROM, and a hard disk drive (HDD). The CPU 92 of the image capture device 9 functions as an image capture control unit 921, a data acquisition unit 922, and a data sending unit 924 by expanding various programs stored in the storage unit 93. The image capture control unit 921 controls the operation of the image capturing unit 90. The data acquisition unit 922 acquires various pieces of information. In the present embodiment, the data acquisition unit 922 acquires captured data from the image capture device 9. The data sending unit 924 sends various pieces of data. In the present embodiment, the image capture device 9 sends captured data to the remote controller 5. The configuration of the image capture device 9 is not limited to the above. At least one or some of the functions of the image capture device 9 may be implemented as one function of any one of the external apparatuses such as the remote controller 5, and the vehicle 10.

FIG. 4 is a block diagram that shows the configuration of the remote controller 5 according to the first embodiment. The remote controller 5 performs remote control on the driving operation of the vehicle 10 by sending a driving control value created by using travel information to the vehicle 10. The travel information is information on the driving condition of the vehicle 10. The travel information includes, for example, captured data containing the vehicle 10, and the position, orientation, travel speed, actual steering angle, and travel route information of the vehicle 10. The travel route information is information indicating a target travel route of the vehicle 10 that moves in the remote automated driving mode.

The remote controller 5 includes a communication unit 51, a CPU 52, and a storage unit 53. The communication unit 51, the storage unit 53, and the CPU 52 are connected to one another via, for example, an internal bus and an interface circuit.

The communication unit 51 of the remote controller 5 connects the remote controller 5 to other devices other than the remote controller 5 such that communication is possible. The communication unit 51 of the remote controller 5 is, for example, a wireless communication device.

The storage unit 53 of the remote controller 5 stores various pieces of information including various programs for controlling the operation of the remote controller 5, and production management information In. The production management information In is information indicating schedule time at which the vehicle 10 moves in a working site where each manufacturing step is performed. The production management information In is created based on, for example, the position and orientation of the vehicle 10, a history of sending a driving control value to the vehicle 10, and an installation location of the image capture device 9. The storage unit 53 of the remote controller 5 includes, for example, a RAM, a ROM, and a hard disk drive (HDD).

The CPU 52 of the remote controller 5 functions as a device acquisition unit 521, a calculation unit 522, a step identification unit 523, a control value creating unit 525, and a device sending unit 526 by expanding various programs stored in the storage unit 53.

The device acquisition unit 521 acquires various pieces of information. In the present embodiment, the device acquisition unit 521 acquires captured data from the image capture device 9. The device acquisition unit 521 acquires a travel speed, an actual steering angle, and the like from the vehicle 10.

The calculation unit 522 calculates the position and orientation of the vehicle 10. In the present embodiment, the calculation unit 522 calculates the position and orientation of the vehicle 10 by analyzing captured data.

The step identification unit 523 identifies the manufacturing steps already performed on the vehicle 10 among the manufacturing steps to be performed in the manufacturing process of the vehicle 10. Then, the step identification unit 523 generates step information indicating the manufacturing steps performed on the vehicle 10. In the present embodiment, the step identification unit 523 identifies the manufacturing steps already performed on the vehicle 10 by using the production management information In and generates step information indicating the identified manufacturing steps.

The control value creating unit 525 creates a driving control value by using travel information. The driving control value includes, for example, an acceleration control value that defines the acceleration of the vehicle 10 in a forward traveling direction and a steering angle control value that defines the steering angle of the vehicle 10. The driving control value may include any one of a trajectory control value and a destination control value, instead of the acceleration control value and the steering angle control value. The trajectory control value is a control value that defines a traveling path of the vehicle 10 by arranging target moving positions set at predetermined time intervals of the vehicle 10 in time-series order. The destination control value is a control value indicating target arrival time to a target arrival place of the vehicle 10.

The device sending unit 526 sends various pieces of information to other devices other than the remote controller 5. In the present embodiment, the device sending unit 526 sends the driving control value and the step information. The configuration of the remote controller 5 is not limited to the above. At least one or some of the functions of the remote controller 5 may be implemented as one function of another apparatus other than the remote controller 5.

Figure 5:
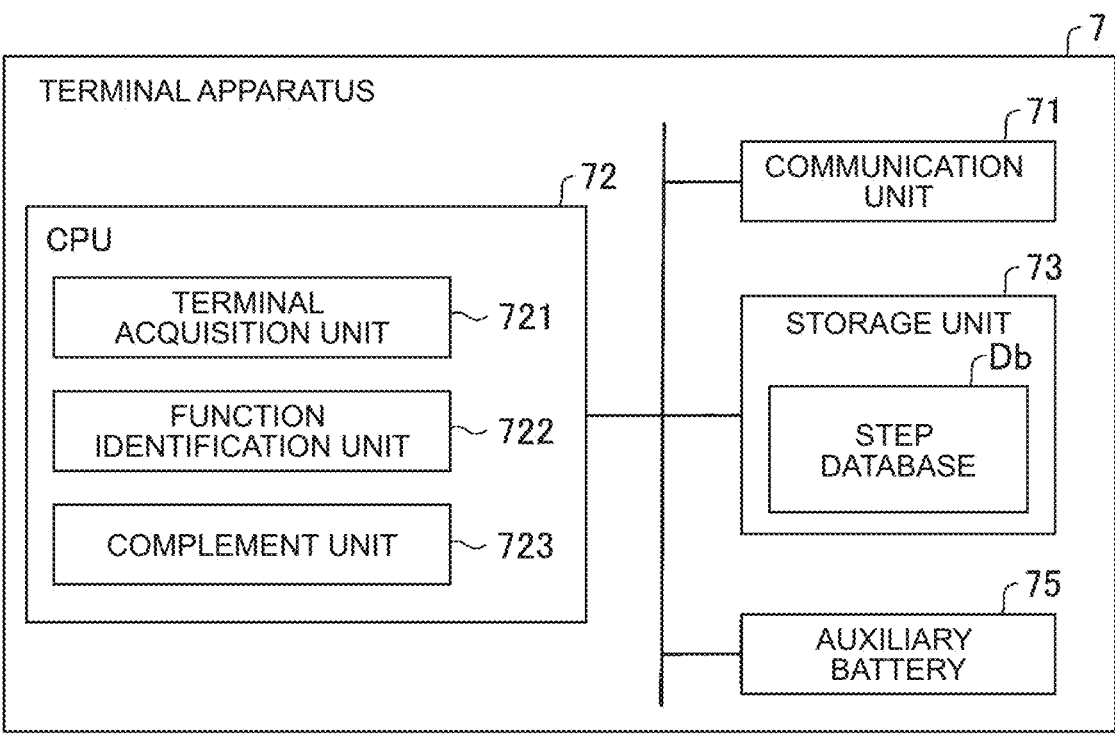
FIG. 5 is a block diagram that shows the configuration of a terminal apparatus according to the first embodiment.

FIG. 5 is a block diagram that shows the configuration of the terminal apparatus 7 according to the first embodiment. The terminal apparatus 7 is used to cause the vehicle 10 in manufacturing to move in the remote automated driving mode. The terminal apparatus 7 complements complement target functions. The complement target functions are functions that cannot be implemented by the functional units 170 already mounted on the vehicle 10 in the manufacturing step among the plurality of functions necessary for the remote control. In the present embodiment, the terminal apparatus 7 is configured to implement all the functions that can be complement target functions in the manufacturing process of the vehicle 10. Here, the functional units 170 are mounted on the vehicle 10 in any one of the plurality of manufacturing steps. Therefore, manufacturing steps performed on the vehicle 10 and complement target functions correlate with each other. Thus, in the present embodiment, complement target functions are identified by using step information.

The terminal apparatus 7 includes a communication unit 71, a storage unit 73, an auxiliary battery 75, and a CPU 72.

The communication unit 71, the storage unit 73, the auxiliary battery 75, and the CPU 72 are connected to one another via, for example, an internal bus and an interface circuit.

In a state where the terminal apparatus 7 is mounted on the vehicle 10, the communication unit 71 of the terminal apparatus 7 connects the devices mounted on the vehicle 10 to external apparatuses such as the remote controller 5 such that communication is possible. In other words, when the vehicle communication unit 172 (FIG. 2) that is one of the functional units 170 is not yet mounted on the vehicle 10, the communication unit 71 of the terminal apparatus 7 serves as a function equivalent to the vehicle communication unit 172 in place of the vehicle communication unit 172. The communication unit 71 of the terminal apparatus 7 is, for example, a wireless communication device.

The storage unit 73 of the terminal apparatus 7 shown in FIG. 5 stores various pieces of information including various programs for controlling the operation of the terminal apparatus 7, and a step database Db. The step database Db is a database indicating complement target functions necessary for each of the plurality of manufacturing steps. The storage unit 73 of the terminal apparatus 7 includes, for example, a RAM, a ROM, and a hard disk drive (HDD).

The auxiliary battery 75 supplies electric power to drive the terminal apparatus 7. Furthermore, when the sub-battery 173 (FIG. 2) is not mounted on the vehicle 10, the auxiliary battery 75 supplies electric power to the vehicle controller 171, the vehicle communication unit 172, and the like already mounted on the vehicle 10, in place of the sub-battery 173.

A CPU 92 of the terminal apparatus 7 shown in FIG. 5 functions as a terminal acquisition unit 721, a function identification unit 722, and a complement unit 723 by expanding various programs stored in the storage unit 73.

The terminal acquisition unit 721 acquires various pieces of information. In the present embodiment, the terminal acquisition unit 721 acquires step information from the remote controller 5. When at least one of the vehicle controller 171 and the vehicle communication unit 172 is not yet mounted on the vehicle 10, the terminal acquisition unit 721 acquires a driving control value.

The function identification unit 722 identifies complement target functions. In other words, the function identification unit 722 identifies functions not yet mounted on the vehicle 10. In the present embodiment, the function identification unit 722 identifies complement target functions associated with manufacturing steps other than the manufacturing step identified by the acquired step information by using the acquired step information and the step database Db stored in the storage unit 73 of the terminal apparatus 7. In other words, the function identification unit 722 extracts complement target functions associated with manufacturing steps not yet performed and a manufacturing step being performed from among the plurality of manufacturing steps that are performed in the manufacturing process of the vehicle 10 from the step database Db. Thus, the function identification unit 722 identifies complement target functions according to the manufacturing steps performed on the vehicle 10.

The complement unit 723 complements the complement target functions. In the present embodiment, the complement unit 723 changes software such that only the identified complement target functions are executed among the plurality of functions necessary for the remote control. Thus, when the terminal apparatus 7 is mounted on the vehicle 10, the complement unit 723 allows the terminal apparatus 7 to complement the complement target functions. Specifically, when the vehicle controller 171 is not yet mounted on the vehicle 10, the complement unit 723 changes software such that a function equivalent to the vehicle controller 171 is implemented in place of the vehicle controller 171. When, for example, a function is not yet implemented because one or some of the plurality of ECUs that make up the vehicle controller 171 are not electrically connected, the complement unit 723 executes the following process. In other words, the complement unit 723 changes software such that a function equivalent to an ECU not yet implementing the function (hereinafter, yet-to-be connected ECU) in place of the yet-to-be connected ECU. When the vehicle communication unit 172 is not yet mounted on the vehicle 10, the complement unit 723 changes software such that the vehicle 10 is capable of communicating with external apparatuses such as the remote controller 5 by using the communication unit 71 of the terminal apparatus 7. Furthermore, when the sub-battery 173 is not yet mounted on the vehicle 10, the complement unit 723 changes software such that the vehicle controller 171 and the vehicle communication unit 172, already mounted on the vehicle 10, can be driven by using the auxiliary battery 75 in place of the sub-battery 173. The configuration of the terminal apparatus 7 is not limited to the above. At least one or some of the functions of the terminal apparatus 7 may be implemented as one function of another apparatus other than the terminal apparatus 7.

Figure 6:
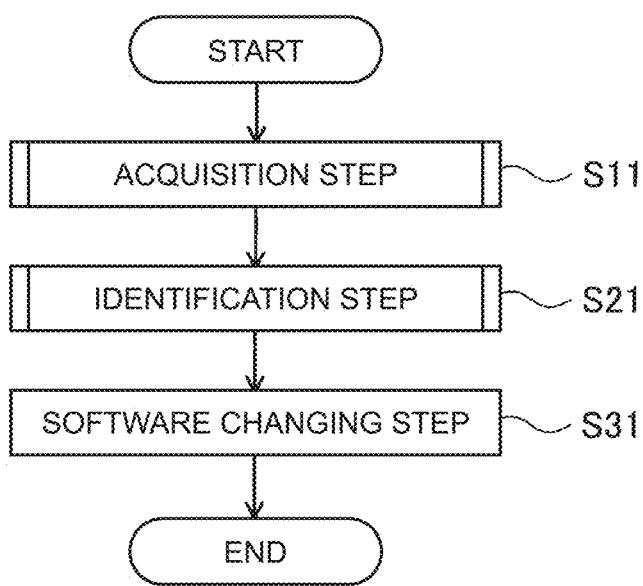
FIG. 6 is a flowchart that shows a remote control method according to the first embodiment.

FIG. 6 is a flowchart that shows a remote control method according to the first embodiment. In the present embodiment, an acquisition step (step S11), an identification step (step S21), and a software changing step (step S31) are executed in this order. Thus, the vehicle 10 in manufacturing is caused to move in the remote automated driving mode by complementing complement target functions using the terminal apparatus 7 of which the software is changed so as to complement the complement target functions identified in accordance with the manufacturing steps already performed on the vehicle 10. The remote control method is, for example, repeatedly executed at predetermined time intervals at or after the vehicle 10 that is a target finishes the platform manufacturing step shown in FIG. 2. The same applies to remote control methods according to embodiments described later.

Figure 7:
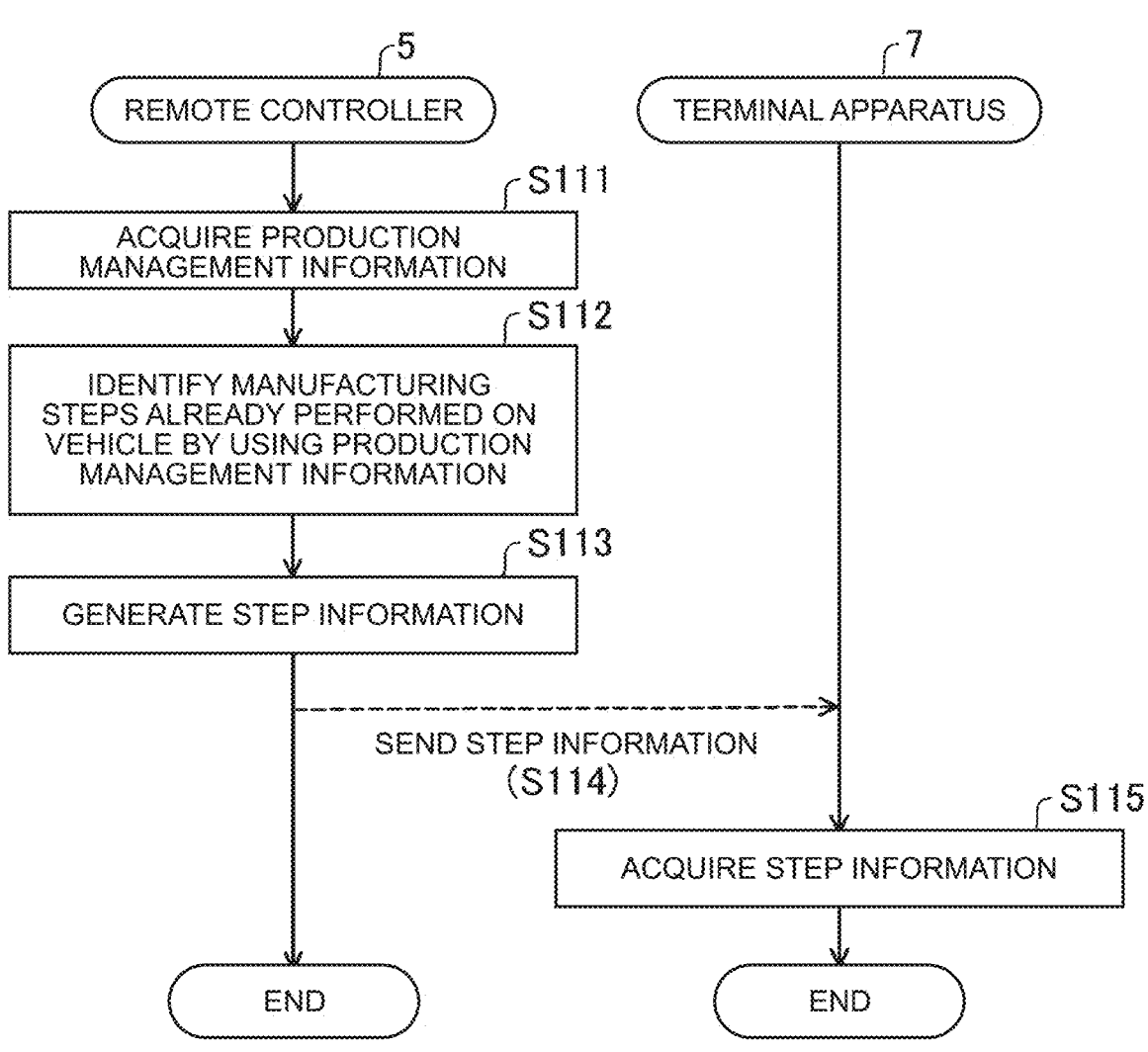
FIG. 7 is a flowchart that shows the details of an acquisition step according to the first embodiment.

FIG. 7 is a flowchart that shows the details of the acquisition step (step S11) according to the first embodiment. In step S111, the device acquisition unit 521 of the remote controller 5 acquires the production management information In. In the present embodiment, the device acquisition unit 521 acquires the production management information In stored in advance in the storage unit 53 of the remote controller 5. In other embodiments, the device acquisition unit 521 may acquire the production management information In from another device other than the remote controller 5. In step S112, the step identification unit 523 identifies the manufacturing steps already performed on the vehicle 10 by using the production management information In. In step S113, the step identification unit 523 generates step information indicating the manufacturing steps already performed on the vehicle 10. In step S114, the device sending unit 526 sends the step information to the terminal apparatus 7. In step S115, the terminal acquisition unit 721 of the terminal apparatus 7 acquires the step information.

Figure 8:
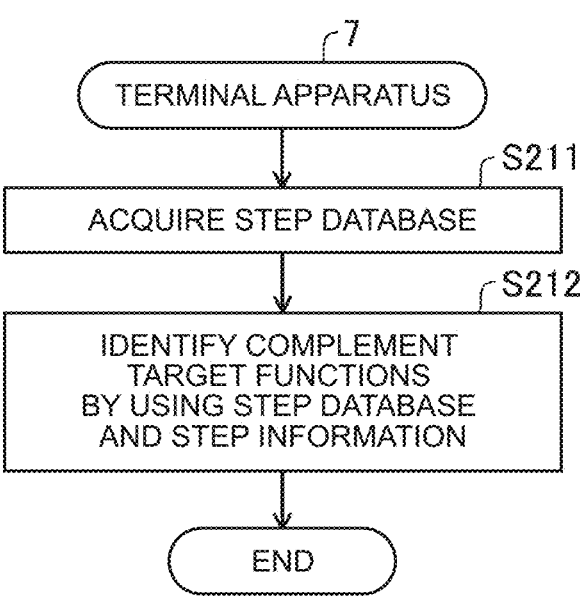
FIG. 8 is a flowchart that shows the details of an identification step according to the first embodiment.

As shown in FIG. 6, subsequent to the acquisition step of step S11, the identification step of step S21 is executed. FIG. 8 is a flowchart that shows the details of the identification step (step S21) according to the first embodiment. In step S221, the terminal acquisition unit 721 of the terminal apparatus 7 acquires the step database Db. In the present embodiment, the terminal acquisition unit 721 acquires the step database Db stored in advance in the storage unit 73 of the terminal apparatus 7. In other embodiments, the terminal acquisition unit 721 may acquire the step database Db from another device other than the terminal apparatus 7. In step S212, the function identification unit 722 identifies complement target functions by using the step information and the step database Db.

As shown in FIG. 6, subsequent to the identification step of step S21, the software changing step of step S31 is executed. In the software changing step, the complement unit 723 changes software such that the complement target functions identified by the function identification unit 722 are complemented. Then, when the vehicle communication unit 172 is already mounted on the vehicle 10, the remote controller 5, after completion of the software changing step, starts communication with the vehicle communication unit 172 and causes the vehicle 10 to move in the remote automated driving mode. When the vehicle communication unit 172 is not yet mounted on the vehicle 10, the remote controller 5, after completion of the software changing step, starts communication with the communication unit 71 of the terminal apparatus 7 and causes the vehicle 10 to move in the remote automated driving mode.

When there is no complement target function identified in the identification step as in the case of the vehicle 10 serving as a finished product, the remote controller 5 causes the vehicle 10 to move in the remote automated driving mode by the functions of the functional units 170 mounted on the vehicle 10 without using the terminal apparatus 7. In other words, in this case, in the remote control method shown in FIG. 6, the software changing step is omitted.

According to the first embodiment, when the terminal apparatus 7 that complements complement target functions is mounted on the vehicle 10 in manufacturing, on which at least one or some of the functional units 170 that implement functions necessary for the remote control are not yet mounted, it is possible to cause the vehicle 10 to move by remote control. Thus, even the vehicle 10 in manufacturing, on which at least one or some of the functional units 170 such as the vehicle controller 171, the vehicle communication unit 172, and the sub-battery 173 that implement functions necessary for the remote control are not yet mounted as in the case of the first-type vehicle 101 can also be caused to move by remote control.

According to the first embodiment, it is possible to identify manufacturing steps performed on the vehicle 10 by using the production management information In. Then, it is possible to generate step information indicating manufacturing steps performed on the vehicle 10.

According to the first embodiment, the functional units 170 are mounted on the vehicle 10 in any one of the plurality of manufacturing steps. Therefore, based on the correlation between each manufacturing step to be performed in the manufacturing process of the vehicle 10 and a complement target function, it is possible to identify complement target functions by using step information indicating manufacturing steps performed on the vehicle 10.

According to the first embodiment, it is possible to acquire step information. Then, it is possible to identify complement target functions associated with manufacturing steps other than the manufacturing steps identified by the acquired step information by using the step information and the step database Db. Thus, it is possible to identify complement target functions according to the manufacturing steps performed on the vehicle 10.

According to the first embodiment, it is possible to identify complement target functions with the terminal apparatus 7 by acquiring the step information from the remote controller 5 serving as an external apparatus.

According to the first embodiment, it is possible to change functions to be complemented by the terminal apparatus 7 by changing software. As a result, when one terminal apparatus 7 is mounted on the vehicle 10, it is possible to complement complement target functions without a need to detach the terminal apparatus 7 in a plurality of manufacturing steps.

B. Second Embodiment

Figure 9:
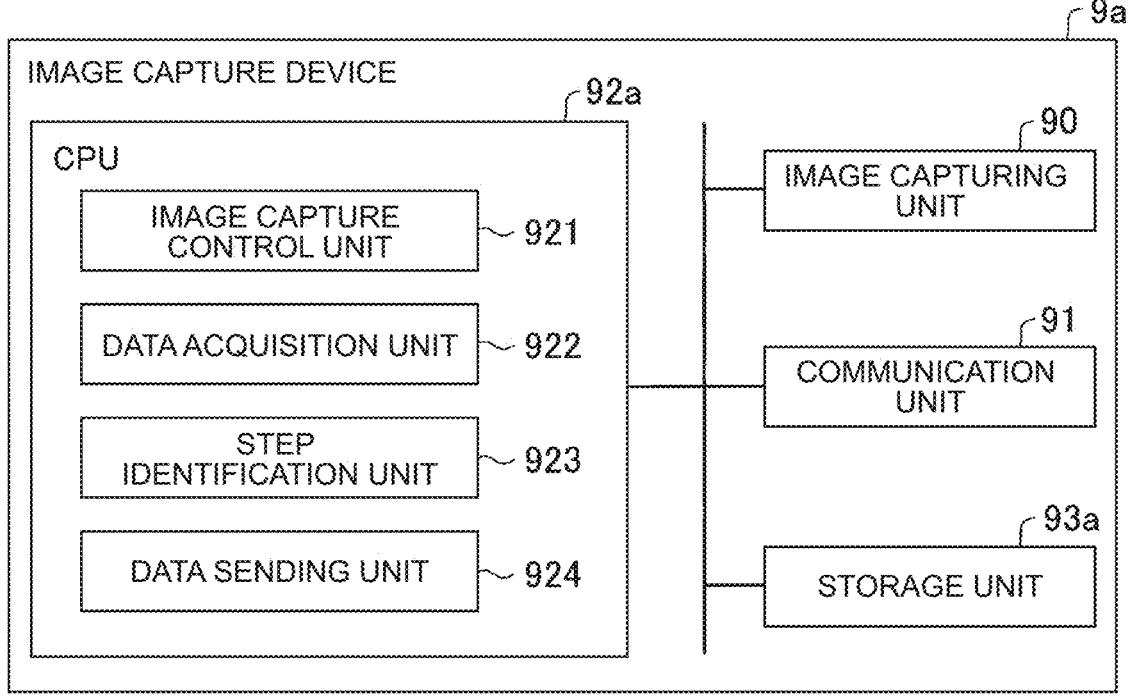
FIG. 9 is a block diagram that shows the configuration of an image capture device according to a second embodiment.
Figure 10:
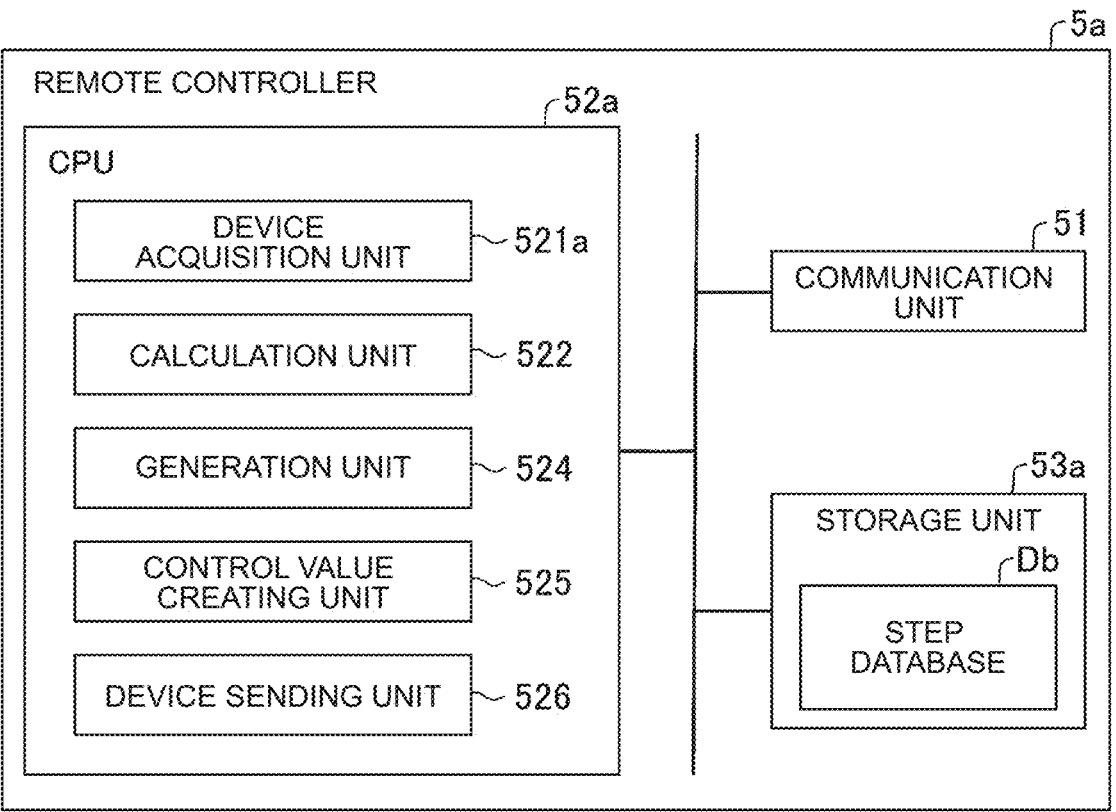
FIG. 10 is a block diagram that shows the configuration of a remote controller according to the second embodiment.
Figure 11:
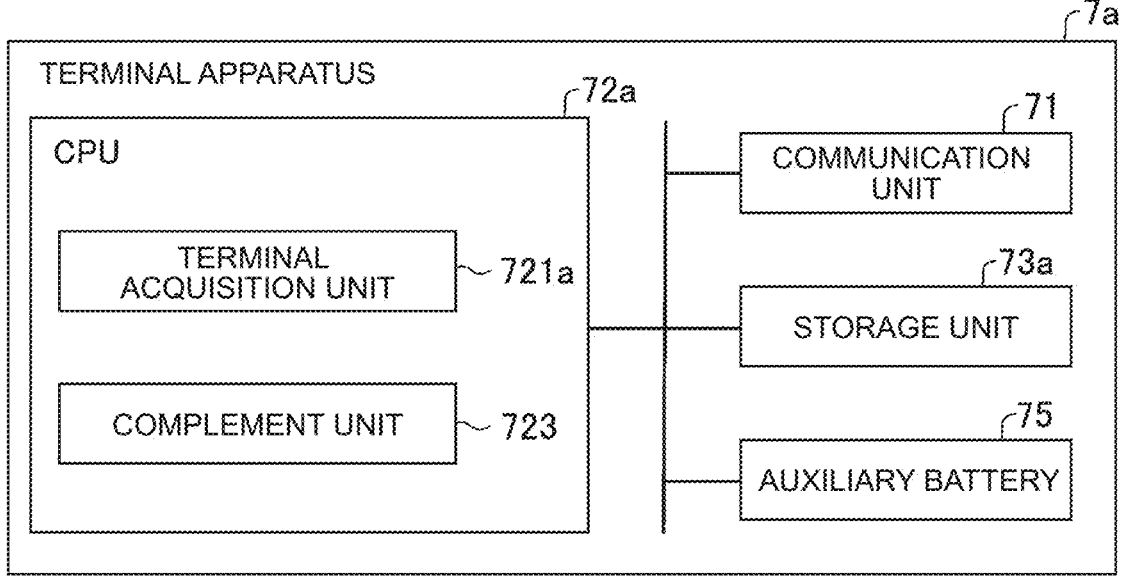
FIG. 11 is a block diagram that shows the configuration of a terminal apparatus according to the second embodiment.

FIG. 9 is a block diagram that shows the configuration of an image capture device 9a according to a second embodiment. FIG. 10 is a block diagram that shows the configuration of a remote controller 5a according to the second embodiment. FIG. 11 is a block diagram that shows the configuration of a terminal apparatus 7a according to the second embodiment. The present embodiment differs from the first embodiment in part of the remote control method. Thus, some of the components of the image capture device 9a, the remote controller 5a, and the terminal apparatus 7a differ from those of the first embodiment. Like reference signs are assigned to the same steps as the steps in the first embodiment and the same components as those of the first embodiment, and the description thereof is omitted.

As shown in FIG. 9, the storage unit 93a of the image capture device 9a stores various pieces of information including various programs for controlling the operation of the image capture device 9a. A CPU 92a of the image capture device 9a further includes a step identification unit 923. The step identification unit 923 identifies manufacturing steps already performed on the vehicle 10 by analyzing captured data. The step identification unit 923 identifies one manufacturing step being performed on the vehicle 10 by, for example, detecting feature points included in the captured data and with which a plurality of manufacturing steps can be recognized. Then, the step identification unit 923 determines manufacturing steps precedent to one manufacturing step identified as being performed on the vehicle 10 among the plurality of manufacturing steps to be performed in the manufacturing process of the vehicle 10 as manufacturing steps already performed on the vehicle 10. Then, the step identification unit 923 generates step information indicating the manufacturing steps already performed on the vehicle 10.

As shown in FIG. 10, the storage unit 53a of the remote controller 5a stores the step database Db instead of the production management information In. A CPU 52a of the remote controller 5a includes a device acquisition unit 521a instead of the device acquisition unit 521 according to the first embodiment. The device acquisition unit 521a acquires step information. Furthermore, the CPU 52a of the remote controller 5a includes a generation unit 524 instead of the step identification unit 523 according to the first embodiment. The generation unit 524 generates function information by using the step information and the step database Db. The function information is information indicating complement target functions according to manufacturing steps already performed on the vehicle 10.

As shown in FIG. 11, the storage unit 73a of the terminal apparatus 7a stores various pieces of information including various programs for controlling the operation of the terminal apparatus 7a. A CPU 72a of the terminal apparatus 7a does not include the function identification unit 722 and includes a terminal acquisition unit 721a and the complement unit 723. The terminal acquisition unit 721a acquires function information from an external apparatus. In the present embodiment, the terminal acquisition unit 721a acquires function information from the remote controller 5a serving as an external apparatus.

Figure 12:
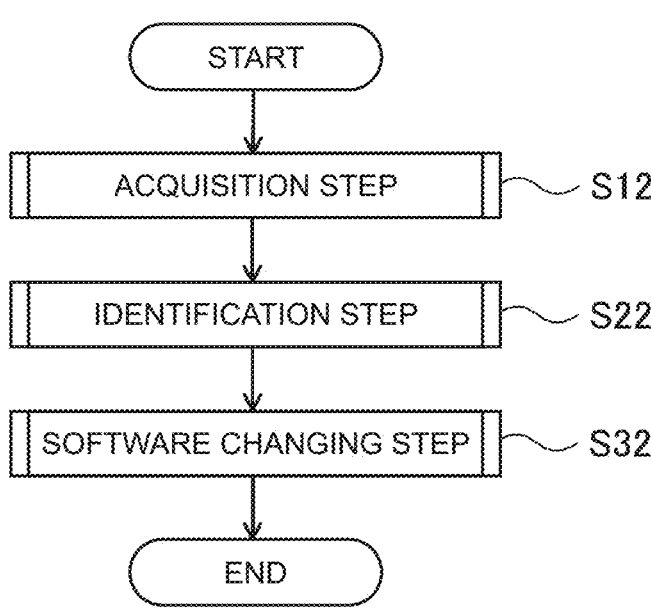
FIG. 12 is a flowchart that shows a remote control method according to the second embodiment.
Figure 13:
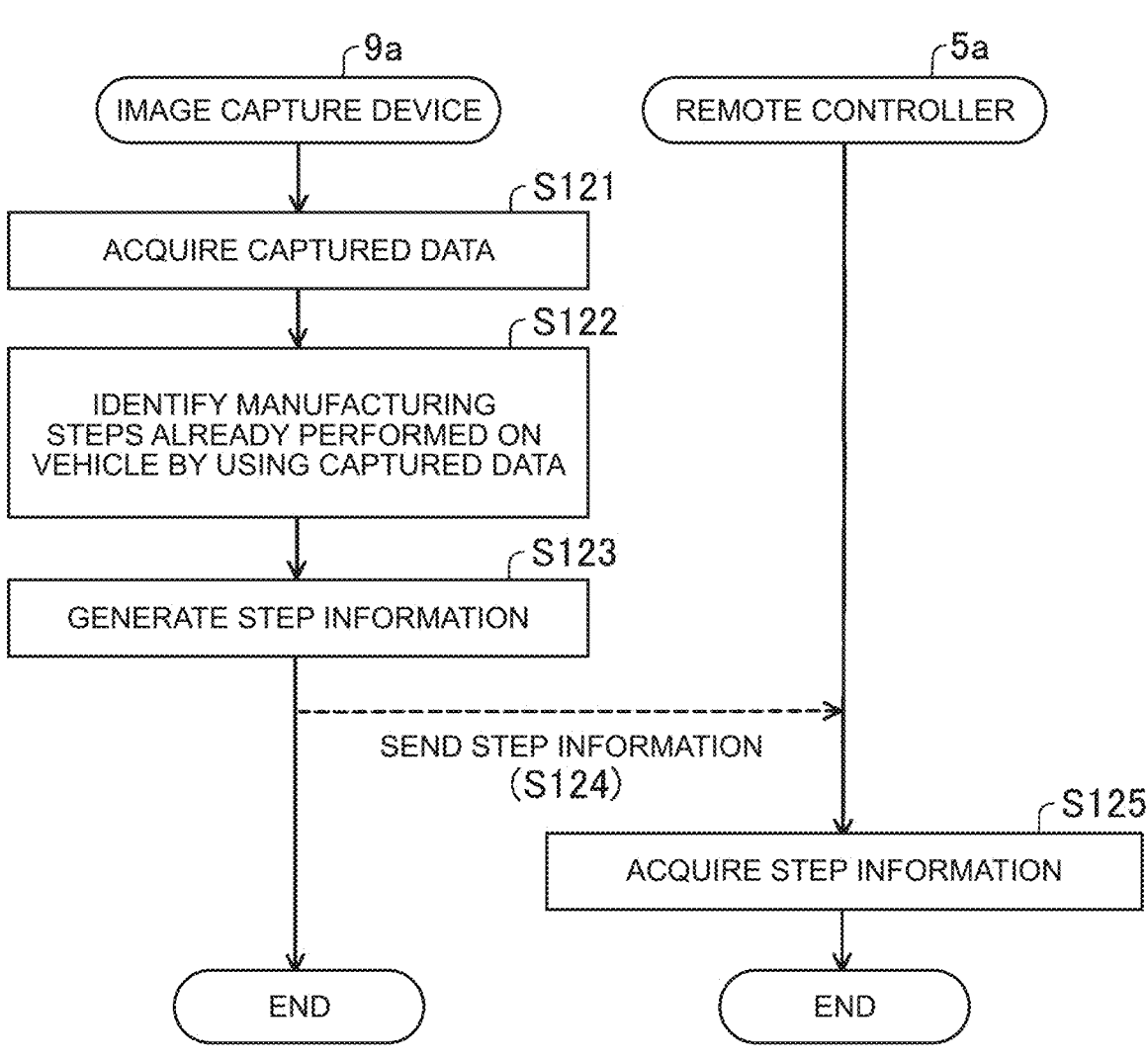
FIG. 13 is a flowchart that shows the details of an acquisition step according to the second embodiment.

FIG. 12 is a flowchart that shows a remote control method according to the second embodiment. FIG. 13 is a flowchart that shows the details of the acquisition step (step S12) according to the second embodiment. In step S121, the data acquisition unit 922 of the image capture device 9a acquires captured data. In step S122, the step identification unit 923 identifies manufacturing steps already performed on the vehicle 10 by using the captured data. In step S123, the step identification unit 923 generates step information. In step S124, the data sending unit 924 sends the step information to the remote controller 5a. In step S125, the device acquisition unit 521a of the remote controller 5a acquires the step information.

Figure 14:
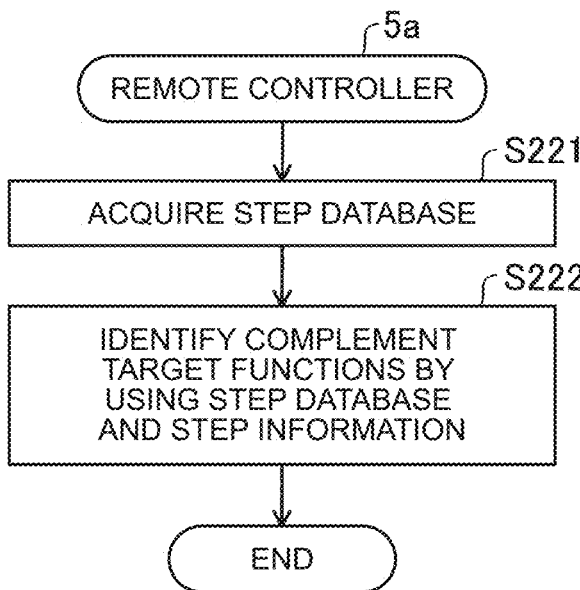
FIG. 14 is a flowchart that shows the details of an identification step according to the second embodiment.

As shown in FIG. 12, subsequent to the acquisition step of step S12, the identification step of step S22 is executed. FIG. 14 is a flowchart that shows the details of the identification step (step S22) according to the second embodiment. In step S221, the device acquisition unit 521a of the remote controller 5a acquires the step database Db. In step S222, the generation unit 524 identifies complement target functions by using the step information and the step database Db.

Figure 15:
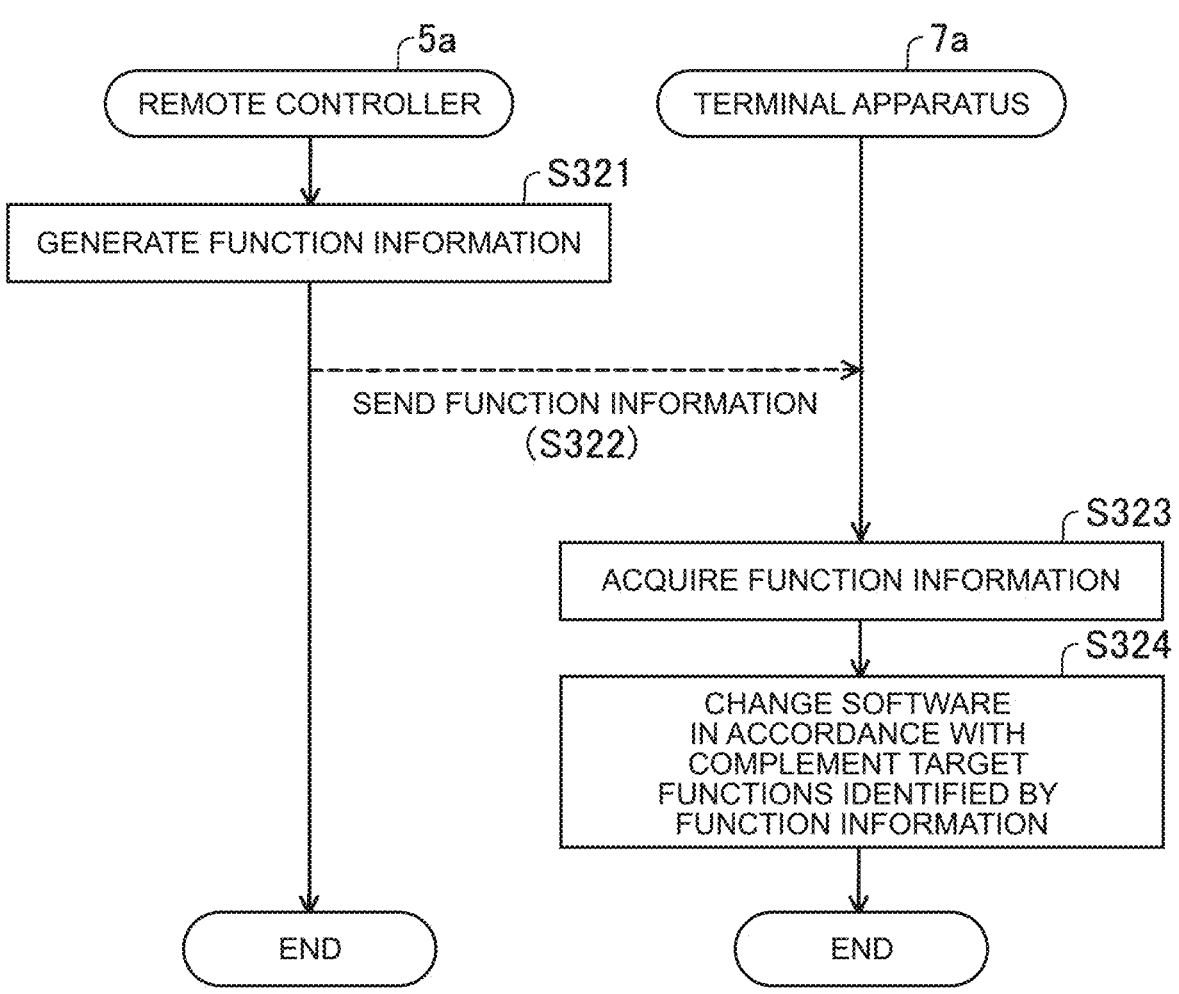
FIG. 15 is a flowchart that shows the details of a software changing step according to the second embodiment.

As shown in FIG. 12, subsequent to the identification step of step S22, the software changing step of step S32 is executed. FIG. 15 is a flowchart that shows the details of the software changing step (step S32) according to the second embodiment. In step S321, the generation unit 524 of the remote controller 5a generates function information. In step S322, the device sending unit 526 sends the function information to the terminal apparatus 7a. In step S323, the terminal acquisition unit 721 of the terminal apparatus 7a acquires the function information from the remote controller 5a. In step S324, the complement unit 723 changes software in accordance with the complement target functions identified by the function information.

According to the second embodiment, it is possible to identify manufacturing steps already performed on the vehicle 10 and generate step information by analyzing captured data.

According to the second embodiment, it is possible to identify complement target functions with the remote controller 5a serving as an external apparatus by acquiring the step information from the image capture device 9a.

According to the second embodiment, the complement unit 723 of the terminal apparatus 7a is capable of recognizing complement target functions by acquiring function information from the remote controller 5a. Thus, the complement unit 723 is capable of complementing the complement target functions identified by the function information.

C. Third Embodiment

Figure 16:
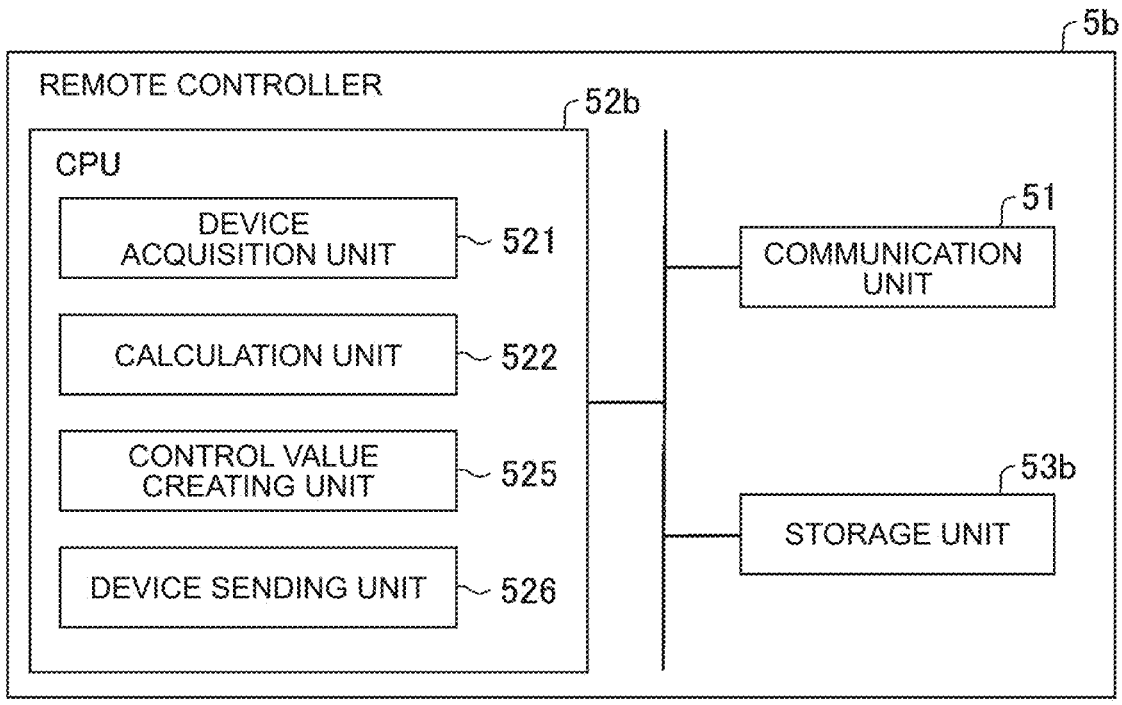
FIG. 16 is a block diagram that shows the configuration of a remote controller according to a third embodiment.
Figure 17:
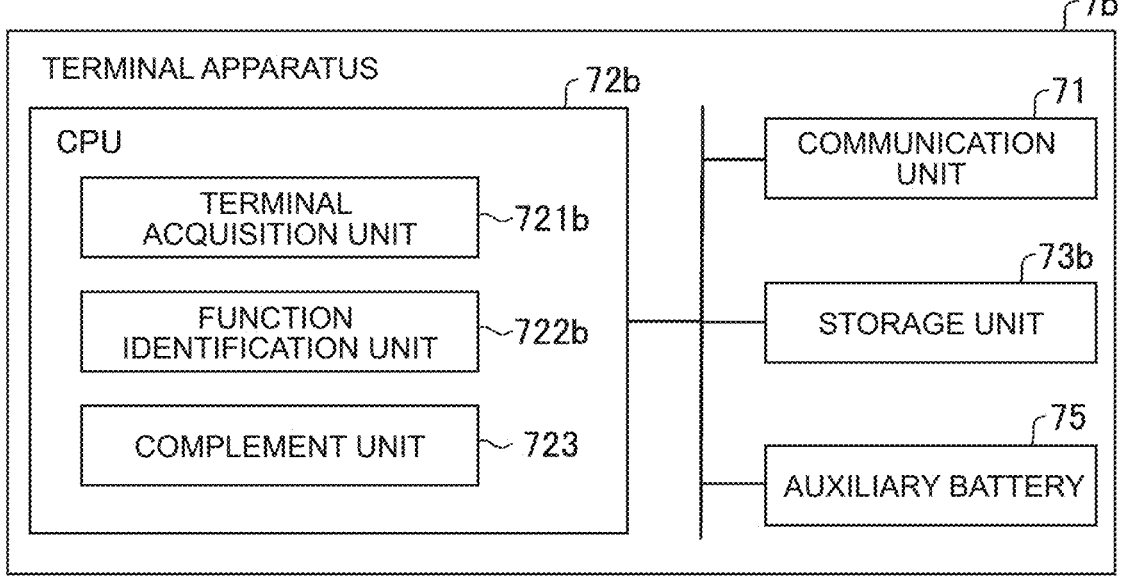
FIG. 17 is a block diagram that shows the configuration of a terminal apparatus according to the third embodiment.

FIG. 16 is a block diagram that shows the configuration of a remote controller 5b according to a third embodiment. FIG. 17 is a block diagram that shows the configuration of a terminal apparatus 7b according to the third embodiment. The present embodiment differs from the first embodiment in part of the remote control method. Thus, some of the components of the remote controller 5b and the terminal apparatus 7b differ from those of the first embodiment. The configuration of the image capture device 9 is the same as that of the first embodiment. Like reference signs are assigned to the same steps as the steps in the first embodiment and the same components as those of the first embodiment, and the description thereof is omitted.

As shown in FIG. 16, the storage unit 53b of the remote controller 5b stores various pieces of information including various programs for controlling the operation of the remote controller 5b. A CPU 52b of the remote controller 5b does not include the step identification unit 523 or the generation unit 524 and includes the device acquisition unit 521, the calculation unit 522, the control value creating unit 525, and the device sending unit 526.

As shown in FIG. 17, the storage unit 73b of the terminal apparatus 7b stores various pieces of information including various programs for controlling the operation of the terminal apparatus 7b. A CPU 72b of the terminal apparatus 7b includes a terminal acquisition unit 721b instead of the terminal acquisition unit 721 according to the first embodiment. The terminal acquisition unit 721b acquires communication availability information. The communication availability information is information indicating whether communication with the functional units 170 is available. The communication availability information includes, for example, CAN data indicating whether a signal can be sent and received between the terminal apparatus 7b and each of the ECUs included in the vehicle controller 171 by controller area network (CAN) communication. The CPU 72b of the terminal apparatus 7b includes a function identification unit 722b instead of the function identification unit 722 according to the first embodiment. The function identification unit 722b identifies complement target functions by using the acquired communication availability information. The function identification unit 722b, for example, identifies the functions of the functional units 170 of which communication is not possible as complement target functions in the communication availability information.

Figure 18:
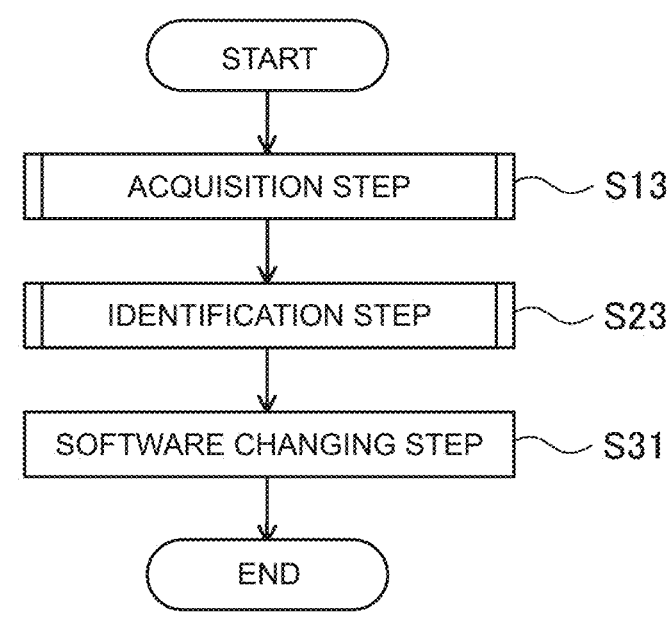
FIG. 18 is a flowchart that shows a remote control method according to the third embodiment.
Figure 19:
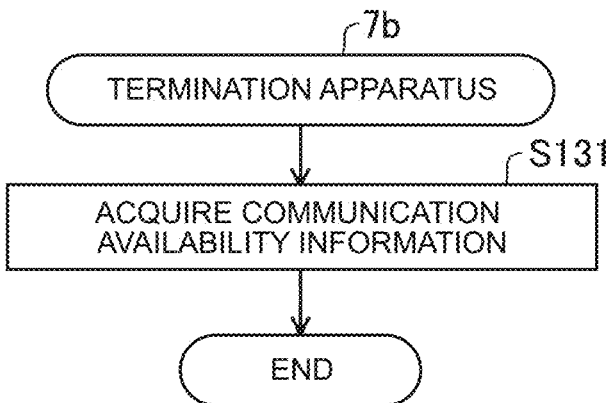
FIG. 19 is a flowchart that shows the details of an acquisition step according to the third embodiment.

FIG. 18 is a flowchart that shows a remote control method according to the third embodiment. FIG. 19 is a flowchart that shows the details of the acquisition step (step S13) according to the third embodiment. In step S131 the terminal acquisition unit 721b of the terminal apparatus 7b acquires the communication availability information.

Figure 20:
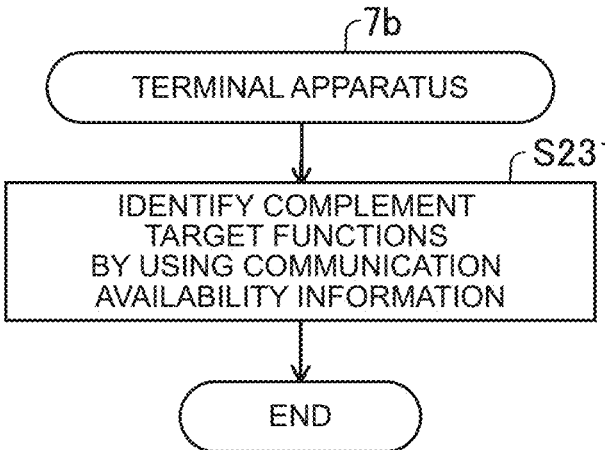
FIG. 20 is a flowchart that shows the details of an identification step according to the third embodiment.

As shown in FIG. 18, subsequent to the acquisition step of step S13, the identification step of step S23 is executed. FIG. 20 is a flowchart that shows the details of the identification step (step S23) according to the third embodiment. In step S231, the function identification unit 722b of the terminal apparatus 7b identifies complement target functions by using the acquired communication availability information.

According to the third embodiment, it is possible to acquire communication availability information. Then, it is possible to identify complement target functions by using the communication availability information. In other words, it is possible to identify complement target functions by using communication with the functional units 170.

According to the third embodiment, it is possible to identify complement target functions by acquiring information for identifying complement target functions in the terminal apparatus 7b without using an external apparatus.

D. Fourth Embodiment

Figure 21:
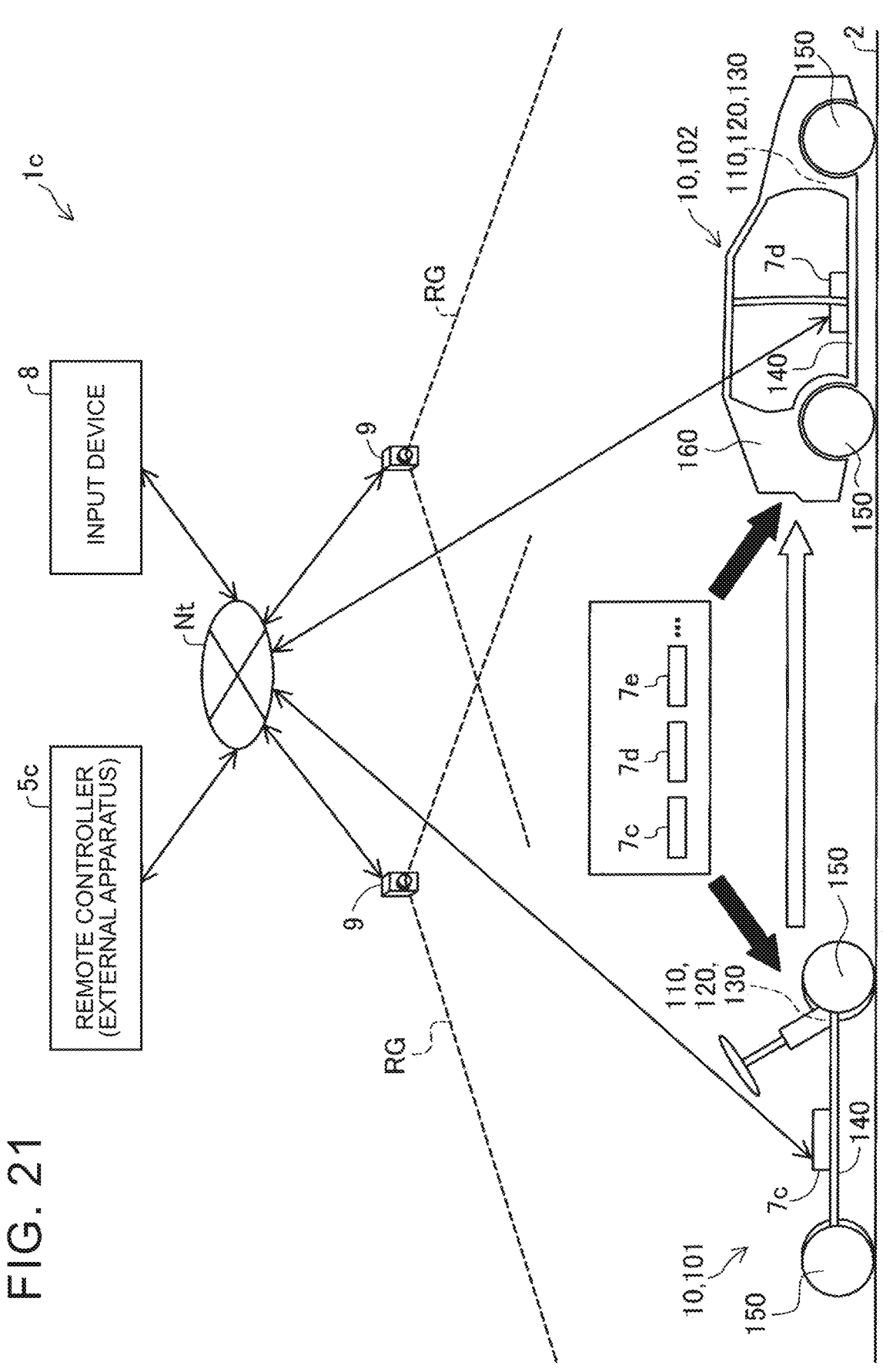
FIG. 21 is a diagram that shows the configuration of a remote control system according to a fourth embodiment.

FIG. 21 is a block diagram that shows the configuration of a remote control system 1c according to a fourth embodiment. In each of the first embodiment to the third embodiment, manufacturing steps already performed on the vehicle 10 are mechanically identified by using any one of the production management information In and captured data. In contrast, in the present embodiment, manufacturing steps already performed on the vehicle 10 are identified by a worker involved in work in each manufacturing step. Accordingly, the remote control system 1c according to the present embodiment further includes an input device 8. The input device 8 is a device for allowing a worker to input step information. In each of the first embodiment to the third embodiment, the terminal apparatus 7, the terminal apparatus 7a, or the terminal apparatus 7b complements complement target functions by changing software in accordance with the complement target functions. In contrast, in the present embodiment, the remote control system 1c includes a plurality of terminal apparatuses 7c 7d, 7e each having a predetermined function, instead of the terminal apparatus 7 according to the first embodiment, the terminal apparatus 7a according to the second embodiment, or the terminal apparatus 7b according to the third embodiment. Thus, from among the terminal apparatuses 7c, 7d, 7e each having one or more predetermined functions, one or some or all of the terminal apparatuses 7c, 7d, 7e, having complement target functions according to manufacturing steps already performed on the vehicle 10, are selected and mounted on the vehicle 10. In other words, software is not changed in accordance with complement target functions, and, from among the terminal apparatuses 7c, 7d, 7e prepared in advance, one or some or all of the terminal apparatuses 7c, 7d, 7e according to step information are selected and mounted on the vehicle 10. Like reference signs are assigned to the same steps as the steps in each of the first embodiment to the third embodiment and the same components as those of each of the first embodiment to the third embodiment, and the description is omitted.

Figure 22:
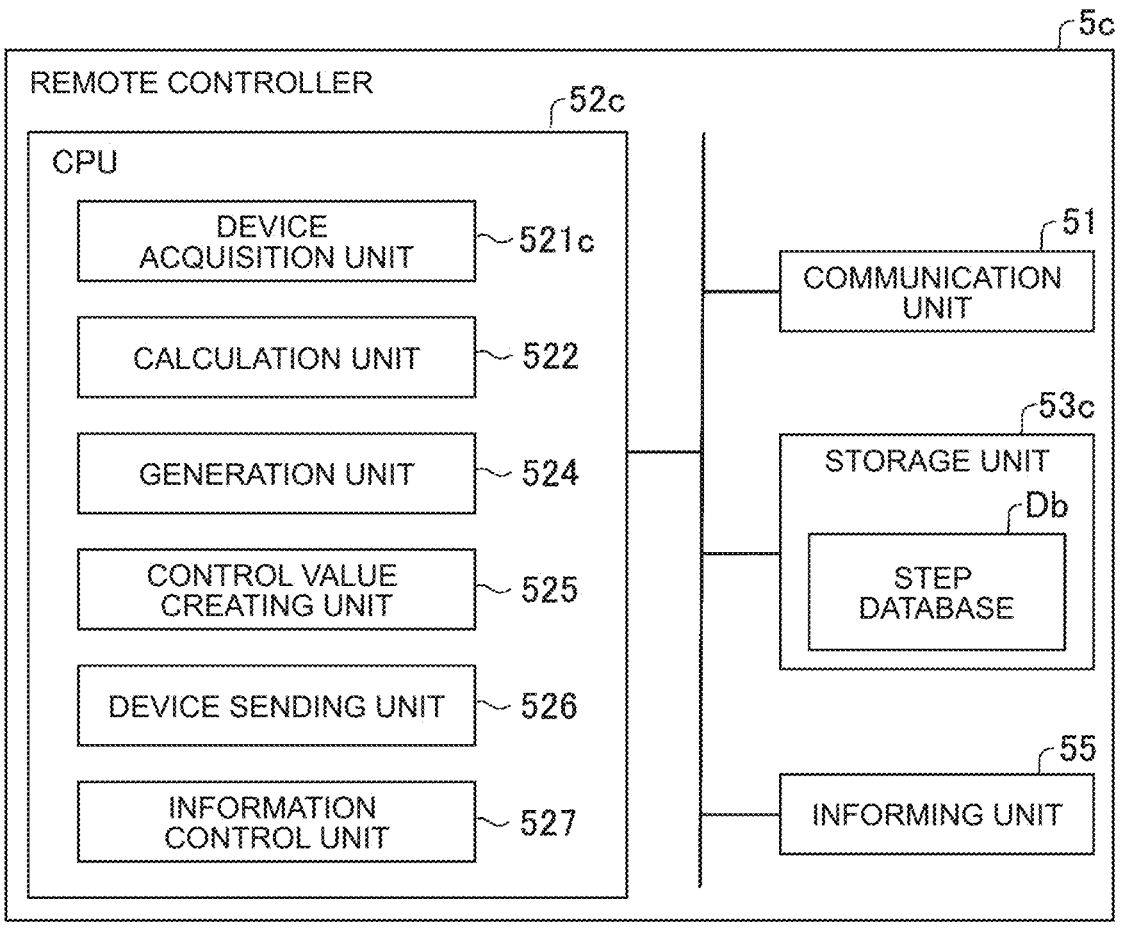
FIG. 22 is a block diagram that shows the configuration of a remote controller according to the fourth embodiment.

FIG. 22 is a block diagram that shows the configuration of a remote controller 5c according to the fourth embodiment. A storage unit 53c of the remote controller 5c stores various pieces of information including various programs for controlling the operation of the remote controller 5c and the step database Db. The remote controller 5c further includes an informing unit 55. The informing unit 55 informs an executor of a mounting step of selection information indicating one or some or all of the terminal apparatuses 7c, 7d, 7e to be mounted on the vehicle 10, among the terminal apparatuses 7c, 7d, 7e prepared in advance. The mounting step is a step of mounting, on the vehicle 10, one or more of the terminal apparatuses 7c, 7d, 7e, having complement target functions identified in the identification step, from among the terminal apparatuses 7c, 7d, 7e each having one or more predetermined functions. The mounting step may be performed manually by a worker or may be performed automatically by a robot. When the executor of the mounting step is a worker, the informing unit 55 is, for example, any one of a display device, such as a display, caused to show selection information and a speaker that reproduces voice indicating selection information. When the executor of the mounting step is a robot, the informing unit 55 is, for example, a sending device that sends selection information to the robot. A CPU 52c of the remote controller 5c further includes an information control unit 527 that controls the operation of the informing unit 55. Any one of the terminal apparatuses 7c, 7d, 7e and the vehicle 10 may include the informing unit 55 and the information control unit 527. When the vehicle 10 includes the informing unit

55, for example, existing equipment mounted on the vehicle 10 like a hazard lamp or a horn may be used as the informing unit 55.

Figure 23:
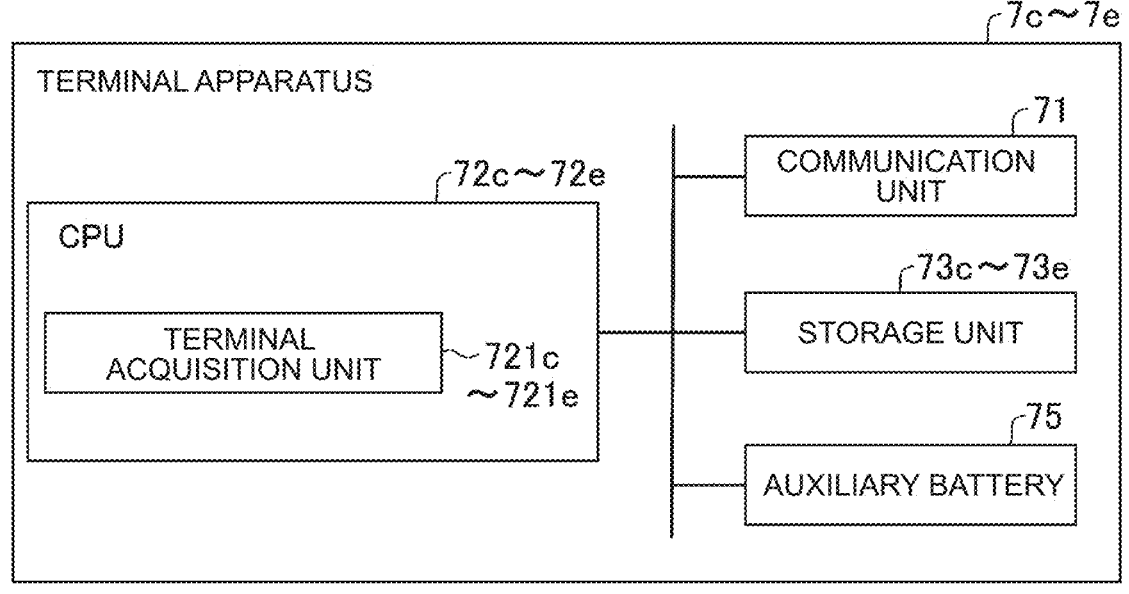
FIG. 23 is a block diagram that shows the configuration of a terminal apparatus according to the fourth embodiment.

FIG. 23 is a block diagram that shows the configuration of each of the terminal apparatuses 7c, 7d, 7e according to the fourth embodiment. A storage unit 73c of the terminal apparatus 7c stores various pieces of information including various programs for controlling the operation of the terminal apparatus 7c. A storage unit 73d of the terminal apparatus 7d stores various pieces of information including various programs for controlling the operation of the terminal apparatus 7d. A storage unit 73e of the terminal apparatus 7e stores various pieces of information including various programs for controlling the operation of the terminal apparatus 7e. A CPU 72c of the terminal apparatus 7c does not include the complement unit 723 and includes a terminal acquisition unit 721c. A CPU 72d of the terminal apparatus 7d does not include the complement unit 723 and includes a terminal acquisition unit 721d. A CPU 72e of the terminal apparatus 7e does not include the complement unit 723 and includes a terminal acquisition unit 721c. Each of the terminal acquisition units 721c, 721d, 721e acquires various pieces of information. Each of the terminal apparatuses 7c, 7d, 7e may have one function or may have a plurality of functions. For example, the terminal apparatuses 7c, 7d, 7e respectively including complement target functions respectively according to the plurality of manufacturing steps to be performed in the manufacturing process of the vehicle 10 may be prepared one by one for the manufacturing steps.

Figure 24:
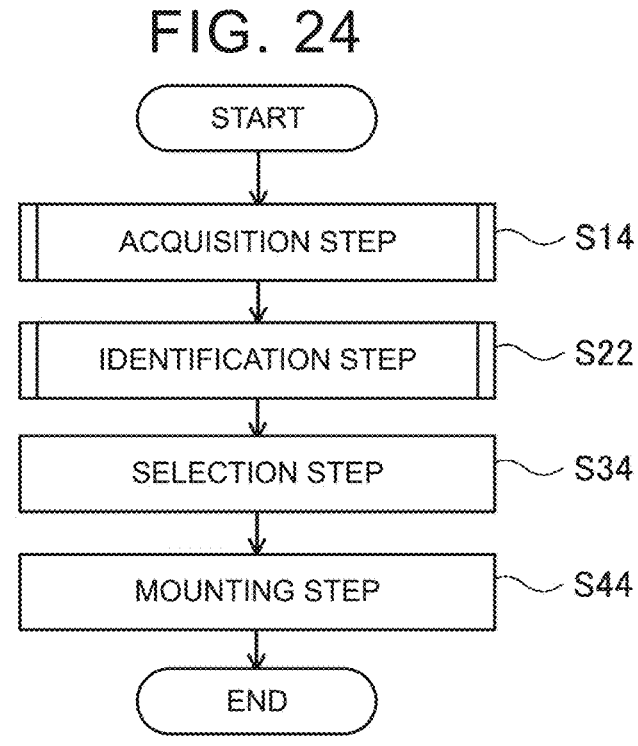
FIG. 24 is a flowchart that shows a remote control method according to the fourth embodiment.
Figure 25:
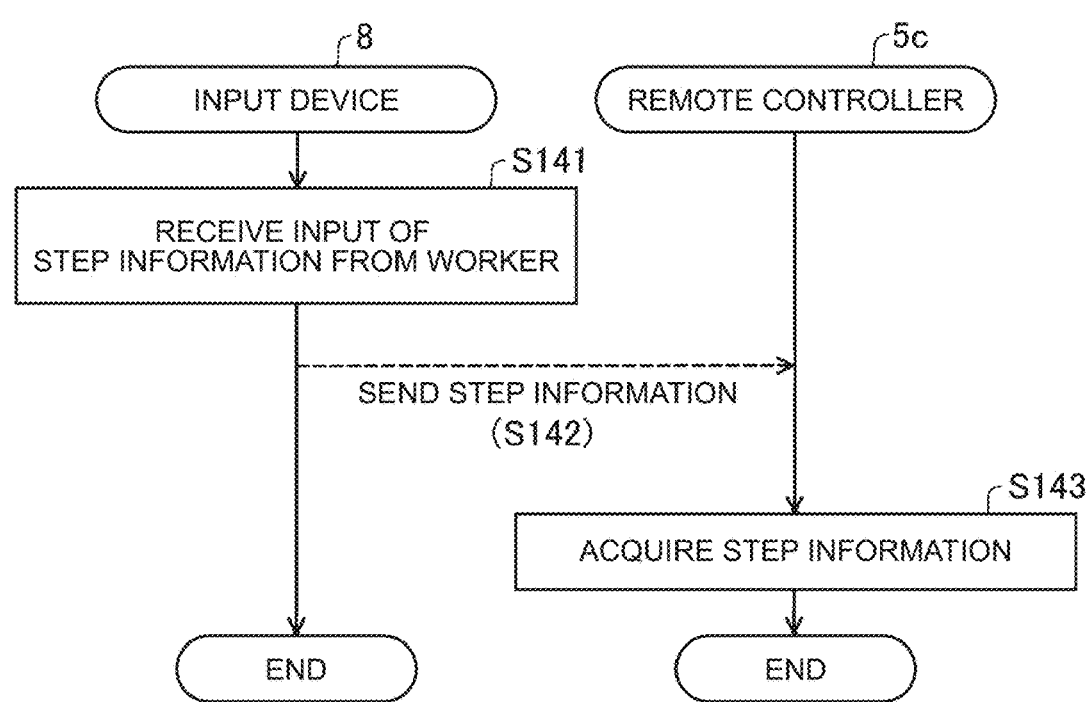
FIG. 25 is a flowchart that shows the details of an acquisition step according to the fourth embodiment.

FIG. 24 is a flowchart that shows a remote control method according to the fourth embodiment. FIG. 25 is a flowchart that shows the details of the acquisition step (step S14) according to the fourth embodiment. FIG. 25 illustrates a case where complement target functions are identified by the remote controller 5c. In step S141, the input device 8 receives input of step information from a worker. In step S142, the input device 8 sends the input step information to the remote controller 5c. In step S143, the device acquisition unit 521c of the remote controller 5c acquires the step information from the input device 8.

As shown in FIG. 24, subsequent to the acquisition step of step S14, the identification step of step S22 is executed. When complement target functions are identified by the remote controller 5c, a process similar to the identification step (step S22) shown in FIG. 14 is executed. As shown in FIG. 24, subsequent to the identification step of step S22, the selection step of step S34 is executed. In the selection step, the information control unit 527 informs the executor of the mounting step of selection information via the informing unit 55. Thus, in the mounting step of step S44, the executor of the mounting step selects one or some or all of the terminal apparatuses 7c, 7d, 7e according to the complement target functions from among the terminal apparatuses 7c, 7d, 7e prepared in advance and mounts the selected one or some of all of the terminal apparatuses 7c, 7d, 7e on the vehicle 10.

The terminal apparatuses 7c, 7d, 7e may identify complement target functions. In this case, each of the CPU 72c of the terminal apparatus 7c, the CPU 72d of the terminal apparatus 7d, and the CPU 72e of the terminal apparatus 7e may further include the function identification unit 722 or the function identification unit 722b. Then, in step S142 shown in FIG. 25, the input device 8 sends step information to the terminal apparatuses 7c, 7d, 7e. The device acquisition unit 521c of the terminal apparatus 7c acquires the step information from the input device 8.

According to the fourth embodiment, from among the terminal apparatuses 7c, 7d, 7e each having one or more complement target functions, one or more of the terminal apparatuses 7c, 7d, 7e, having the complement target functions identified in the identification step, can be mounted on the vehicle 10. As a result, without changing software for changing the functions of the terminal apparatuses 7c, 7d, 7e, it is possible to complement target functions and cause the vehicle 10 to move in the remote automated driving mode. Thus, it is possible to reduce a processing load on the terminal apparatuses 7c, 7d, 7e.

E. Alternative Embodiments

E-1. First Alternative Embodiment

The remote control method may further include the following step when the terminal apparatuses 7, 7a, 7b, 7c, 7d, 7e have been already mounted on the vehicle 10 in a case where the terminal apparatuses 7, 7a, 7b, 7c, 7d, 7e are mounted on the vehicle 10 in the mounting step. In this case, the remote control method may include a removal step of removing the terminal apparatuses 7, 7a, 7b, 7c, 7d, 7e mounted on the vehicle 10 from the vehicle 10. According to such a configuration, the unnecessary terminal apparatuses 7, 7a, 7b, 7c, 7d, 7e can be removed from the vehicle 10.

E-2. Second Alternative Embodiment

The remote control method may further include a determining step of determining whether to mount the terminal apparatuses 7, 7a, 7b, 7c, 7d, 7e on the vehicle 10. For example, any one of an external apparatus, such as the remote controller 5, the remote controller 5a, the remote controller 5b, and the remote controller 5c, and the terminal apparatuses 7, 7a, 7b, 7c, 7d, 7e may include a determining unit that determines whether to mount the terminal apparatuses 7, 7a, 7b, 7c, 7d, 7e on the vehicle 10. The determining unit, for example, determines whether to mount the terminal apparatuses 7, 7a, 7b, 7c, 7d, 7e on the vehicle 10 by using an identified result in the identification step. Specifically, when there is no complement target function identified in the identification step, the determining unit determines not to mount the terminal apparatuses 7, 7a, 7b, 7c, 7d, 7e on the vehicle 10. On the other hand, when one or more complement target functions are identified in the identification step, the determining unit determines to mount the terminal apparatuses 7, 7a, 7b, 7c, 7d, 7e on the vehicle 10. According to such a configuration, it is possible to determine whether to mount the terminal apparatuses 7, 7a, 7b, 7c, 7d, 7e on the vehicle 10. The determining unit may determine whether to mount the terminal apparatuses 7, 7a, 7b, 7c, 7d, 7e on the vehicle 10 by using, for example, step information and the step database Db. According to such a configuration, in the remote control method, it is possible to determine whether to mount the terminal apparatuses 7, 7a, 7b, 7c, 7d, 7e on the vehicle 10 without executing the identification step.

E-3. Third Alternative Embodiment

The remote control method may further include a determining step and a removal step. According to such a configuration, when it is determined to mount the terminal apparatuses 7c, 7d, 7e in a case where the other terminal apparatuses 7c, 7d, 7e have been already mounted on the vehicle 10, it is possible to replace the unnecessary terminal apparatuses 7c, 7d, 7e with the terminal apparatuses 7c, 7d, 7e to be mounted.

The disclosure is not limited to the above-described embodiments and may be implemented in various modes without departing from the purport of the disclosure. For example, the technical characteristics in the embodiments, corresponding to the technical characteristics in the aspects described in SUMMARY, may be replaced or combined as needed to solve part or all of the above-described inconvenience or to achieve part or all of the above-described advantageous effects. When the technical characteristics not described as being indispensable in the specification may be deleted as needed.

A part of the embodiment of the present disclosure is shown as an example below. However, it should be noted that the embodiment of the present disclosure is not limited to these.

A fourth aspect of the disclosure provides a remote control method. The remote control method performs remote control on a driving operation of a vehicle. The vehicle is configured to move by remote control in a factory in which a plurality of manufacturing steps is performed to manufacture the vehicle. The functional unit that implements a plurality of functions necessary for the remote control is mounted on the vehicle in any one of the plurality of manufacturing steps. The remote control method includes mounting a terminal apparatus having a complement target function on the vehicle. The complement target function is identified by using at least one of step information indicating the manufacturing step performed on the vehicle and communication availability information indicating whether communication with the functional unit is available. The complement target function is not implemented by the functional unit mounted on the vehicle of the plurality of functions necessary for the remote control. According to this configuration, it is possible to mount one or more terminal apparatuses having complement target functions on the vehicle from among the plurality of terminal apparatuses each having one or more complement target functions. Thus, even a vehicle in manufacturing, on which at least one or some of a plurality of functional units that implement functions necessary for the remote control are not yet mounted, is allowed to move by remote control.

What is claimed is:

1. A terminal apparatus used to perform remote control on a driving operation of a vehicle, the vehicle being configured to move by remote control in a factory in which a plurality of manufacturing steps is performed to manufacture the vehicle, a plurality of functional units that implements a plurality of functions necessary for the remote control being mounted on the vehicle in the plurality of manufacturing steps, the terminal apparatus comprising a first processor configured to implement a complement target function of the plurality of functions necessary for the remote control, the complement target function being identified by using at least one of: (i) step information indicating the manufacturing step performed on the vehicle and (ii) communication availability information indicating whether communication with at least one of the functional units is available, the complement target function being a function that is not implemented by any of plurality of the functional units already mounted on the vehicle, wherein the first processor changes software of the terminal apparatus so as to change functions to be implemented by the terminal apparatus such that, among the plurality of functions necessary for the remote control, only the identified complement target function is implemented by the terminal apparatus, based upon the determination that the identified complement target function is not implemented by any of the plurality of the functional units already mounted on the vehicle.

2. The terminal apparatus according to claim 1, further comprising a process database that stores an association between each of the plurality of manufacturing steps and each of the plurality of the functional units to be mounted on the vehicle at a time of completion of each of the plurality of manufacturing steps, wherein the first processor is configured to acquire the step information indicating which ones of the plurality of manufacturing steps have already been completed on the vehicle, and identify the complement target function according to the manufacturing step performed on the vehicle by identifying the complement target function associated with the manufacturing step other than the manufacturing step identified by the acquired step information using the acquired step information and a step database indicating the complement target function necessary for each of the plurality of manufacturing steps, wherein the identified complementary target function corresponds to functional units scheduled to be mounted in manufacturing steps that are to be performed after the manufacturing steps indicated by the acquired step information.

3. The terminal apparatus according to claim 1, wherein the first processor is configured to acquire the communication availability information, and identify the complement target function by using the acquired communication availability information.

4. A remote control system that performs remote control on a driving operation of a vehicle, the remote control system comprising:

the vehicle;

the external apparatus installed in a place different from a place where the vehicle is; and the terminal apparatus according to claim 1, wherein:

the functional unit that implements a plurality of functions necessary for the remote control is mounted on the vehicle in any one of the plurality of manufacturing steps;

the external apparatus includes a second processor; and the second processor is configured to acquire step information indicating the manufacturing step performed on the vehicle, generate function information indicating the complement target function according to the manufacturing step performed on the vehicle by identifying the complement target function associated with the manufacturing step other than the manufacturing step identified by the acquired step information using the acquired step information and a step database indicating the complement target function necessary for each of the plurality of manufacturing steps, and send the function information to the vehicle.

5. A remote control method that performs remote control on a driving operation of a vehicle, the vehicle being configured to move by remote control in a factory in which a plurality of manufacturing steps is performed to manufacture the vehicle, a plurality of functional units that implements a plurality of functions necessary for the remote control being mounted on the vehicle in the plurality of manufacturing steps, the remote control method comprising:

acquiring information of at least one of: (i) step information indicating the manufacturing step performed on the vehicle and (ii) communication availability information indicating whether communication with at least one of the functional units is available;

identifying a complement target function of the plurality of functions necessary for the remote control, wherein, the complement target function being a function that is not implemented by any of plurality of the functional units already mounted on the vehicle, based on the acquired information;

detachably mounting one or more terminal apparatuses having the identified complement target function on the vehicle from among a plurality of terminal apparatuses each having one or more of the complement target functions; and changing software of the terminal apparatus so as to change functions to be implemented by the terminal apparatus such that, among the plurality of functions necessary for the remote control, only the identified complement target function is implemented by the terminal apparatus, based upon the determination that the identified complement target function is not implemented by any of the plurality of the functional units already mounted on the vehicle.

6. The remote control method according to claim 5, further comprising determining whether to mount the one or more terminal apparatuses on the vehicle.

7. The remote control method according to claim 5, further comprising removing the one or more terminal apparatuses mounted on the vehicle from the vehicle.

8. The remote control method according to claim 5, wherein the vehicle is any one of a first-type vehicle in a form of platform, at least including a wheel, a chassis, a drive unit configured to accelerate the vehicle, a steering device configured to change a traveling direction of the vehicle, and a braking device configured to decelerate the vehicle, and a second-type vehicle in a form in which at least a vehicle body is assembled to the first-type vehicle.

9. The terminal apparatus according to claim 1, wherein the identified complement target function includes a wireless communication function for communicating with an external apparatus that performs the remote control, the wireless communication function being a function that is implemented by a vehicle communication unit when the vehicle communication unit is one of the plurality of the functional units already mounted on the vehicle, and the first processor is configured to implement the wireless communication function by using a communication unit of the terminal apparatus when the vehicle communication unit is not yet mounted on the vehicle.

* * * * *